(12) United States Patent
Kim et al.

(10) Patent No.: US 11,442,173 B2
(45) Date of Patent: Sep. 13, 2022

(54) GNSS-BASED TIMING SYNCHRONIZATION

(71) Applicant: Mitsubishi Electric Research Laboratories, Inc., Cambridge, MA (US)

(72) Inventors: Kyeong-Jin Kim, Lexington, MA (US); Sriramya Bhamidipati, Urbana, IL (US); Hongbo Sun, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 886 days.

(21) Appl. No.: 16/261,718

(22) Filed: Jan. 30, 2019

(65) Prior Publication Data

US 2020/0241146 A1    Jul. 30, 2020

(51) Int. Cl.
*G01S 19/21* (2010.01)

(52) U.S. Cl.
CPC .................. *G01S 19/215* (2013.01)

(58) Field of Classification Search
CPC .......................................... G01S 19/215
See application file for complete search history.

(56) References Cited

U.S. PATENT DOCUMENTS

| | | | | |
|---|---|---|---|---|
| 2008/0309553 A1* | 12/2008 | Chansarkar | .......... | H04B 1/7085 342/357.25 |
| 2011/0050489 A1* | 3/2011 | Maenpa | .................. | G01S 19/23 342/357.69 |
| 2014/0232595 A1* | 8/2014 | Rife | .......................... | G01S 19/03 342/357.58 |
| 2015/0293234 A1* | 10/2015 | Snyder | ..................... | H04K 3/65 342/357.59 |
| 2017/0090036 A1* | 3/2017 | Zalewski | .............. | G01S 19/215 |

FOREIGN PATENT DOCUMENTS

| | | | | |
|---|---|---|---|---|
| GB | 2509343 A | * | 7/2014 | .......... G01S 19/258 |
| WO | WO-2020149014 A1 | * | 7/2020 | .......... G01S 19/258 |

* cited by examiner

*Primary Examiner* — Vladimir Magloire
*Assistant Examiner* — Nazra Nur Waheed
(74) *Attorney, Agent, or Firm* — Gennadiy Vinokur; Hironori Tsukamoto

(57) ABSTRACT

A time synchronization system an input interface configured to receive pseudorange measurements from a set of antennas of at least one Global Navigation Satellite System (GNSS) receiving system that operates the antennas at known positions according to a clock with an unknown time bias to receive signals from satellites in sight of the antennas and an output interface configured to output the determined time bias. The time synchronization system also includes a processor configured to compare the pseudorange measurements of different antennas to produce an antenna-specific clock offset for each of the antennas, correct the pseudorange measurements of the antennas according to the antenna-specific clock offsets of corresponding antennas to produce corrected pseudorange measurements, and determine the time bias of the clock using the corrected pseudorange measurements.

20 Claims, 18 Drawing Sheets

GNSS-BASED TIMING SYNCHRONIZATION

TECHNICAL FIELD

The present invention relates generally to Global Navigation Satellite Systems (GNSS), and particularly to GNSS-based accurate timing applications.

BACKGROUND

Global Navigation Satellite Systems (GNSS) receivers, such as a Global Positioning System (GPS), Global Navigation Satellite System (GLONASS), GALILEO and others are widely used for positioning, navigation and timing applications, due to the free availability of GNSS time.

Precise timing is crucial to a variety of activities, such as financial and banking networks, power stations and other crucial facilities, which all rely on precision timing for synchronization and operational efficiency, especially if they are located in different geographical facilities. Companies worldwide use GNSS timing to time-stamp business transactions, thereby providing a consistent and accurate way to maintain records and ensure their traceability. Banks use GPS timing to synchronize their network computers located around the world. Large and small businesses are turning to automated systems that can track, update, and manage multiple transactions made by a global network of customers. These applications require accurate timing information available through GNSS.

Also, distributed networks of instruments that must work together to precisely measure common events require timing sources that can guarantee accuracy at different locations. For example, integration of GPS time into seismic monitoring networks enables researchers to quickly locate the epicenters of earthquakes and other seismic events.

For example, communication and computer networks require time synchronization to function properly. Cellular base stations must be synchronized with very high accuracy, in order to allow mobile devices to share limited radio spectrum more efficiently and to transfer the connection when transiting between stations. Mobile data networks use GNSS timing as an accurate reference, in order to keep all the base stations synchronized. Digital broadcast radio services use GNSS timing to ensure that the bits from all radio stations arrive to the receivers in precise timing. This allows listeners to toggle between stations with minimum delay.

Electric Power companies and utilities use precise timing to allow efficient power transmission and distribution. Electric power substations use GPS-based time synchronization devices to improve time synchronization throughout the power grid in order to avoid power outages. By analyzing the precise timing of an electrical anomaly as it propagates through a grid, it is possible to trace back the exact location of any outage in the power line.

However, GNSS signals are vulnerable to in-band interferences either intentional or accidental. For example, a jamming signal transmitted to a GNSS receiver is intended to disrupt the receiving capabilities of the receiver and further interrupt the availability of a valid signal at the receiver. A jammed receiver will not be able to decode any signal, nor be able to provide accurate position or time data. This is the case of complete jamming, which causes pseudoranges not to be observed at the GNSS receivers. During a partial jamming, pseudoranges are still available, but they are very noisy. Similarly, the transmission of data from a satellite is inhibited in the presence of a jamming signal.

On the other hand, meaconing occurs when a signal provides incorrect or misleading information to the receiver. The receiver, in turn, utilizes this signal to calculate inaccurate position and time data. A misleading position results from the successful transmission of a meaconing signal. Since the electromagnetic signals can be recorded by an unintended receiver, a meaconing signal may be the retransmission of a previously recorded signal. This retransmission of a recorded signal by an unintended receiver makes it difficult to differentiate from a properly transmitted signal. In addition to this type of meaconing, many GNSS receivers accept any signals look like GNSS signals as being authentic, and then utilize them to generate position and time date. Thus, imitating the GNSS signal rather than interfering and retransmitting of a previously recorded signal with GNSS signals is another type of deceiving, which is called spoofing. Overall, jamming, meaconing, and spoofing, together or separately, can force GNSS-based systems below a predetermined reliability threshold. Without additional differentiation, we will recognize meaconing as one type of spoofing in the sequel. In addition, interference can be a general term that includes intentional jamming, meaconing, and spoofing signals, or accidental signals.

The GNSS-based systems can be jammed, spoofed, or blocked, intentionally or unintentionally without any alert, thereby posing a serious threat on the performance and on the functioning of systems, which rely upon their timing. Even low-power interference is sufficient to easily jam or spoof GNSS receivers within a radius of several kilometers. Spoofing attacks are even more menacing than jamming since the target receiver is not aware of this threat. Commercial GNSS receiver is a backward compatible technology whose signal structure is in the public domain. This makes GNSS-based technology more susceptible to disruptive interfering. Furthermore, recently the implementation of sophisticated spoofers has become more feasible, flexible, and less costly due to rapid advances in Software-Defined Radio (SDR) technology. Spoofing attacks are made using low-cost commercial equipment against a wide variety of GNSS receivers in which counterfeit GNSS signals are generated for manipulating a target receiver's reported position and time. Such attacks threaten the integrity of financial transactions, communications, and power grid monitoring operations that depend on GPS signals for accurate positioning and timing. Thus, there is a need to protect these mentioned GNSS-based applications from interference whether it is intentional or unintentional since disruption of GNSS signals can cause critical consequences.

Some methods use additional clocks and/or GNSS simulators to detect the spoofing, see, e.g., a method described in US20180196142A1. However, additional GNSS simulators are not always desirable and/or available.

SUMMARY

It is an object of one embodiment to provide a system and a method for time synchronization based on signals received from satellites. It is another object of another embodiment to provide such a time synchronization system that is resilient to interference attacks aiming to corrupt the satellite signals. Examples of such interference include spoofing and meaconing of the satellite signals. Each satellite signal includes information about accurate time and position of the satellite. Thus, a satellite-based time synchronization can be performed with satellite signals if the information in the satellite signals is not corrupted.

Some embodiments are based on recognition that while a deceiver or attacker can corrupt any satellite signal emitted by a satellite in a sight of one particular GNSS system, it is more difficult to corrupt multiple satellite signals emitted by different satellites. To that end, the authenticity of satellite signals can be checked by comparing satellite signals transmitted by different satellites with each other.

To compare satellite signals emitted by different satellites, it is necessary to use a unique parameter out of the GNSS. Some embodiments are based on realization that different satellite signals carry the same time and when measured using a common clock, the measurements from different satellites should exhibit the common clock offset when all satellite signals are authentic. However, in the event of interference, such as meaconing or spoofing, the affected satellite should exhibit different antenna specific clock offsets. In such a manner, clock offset between antennas can be a comparison metric.

For example, if a clock of the GNSS receiving system uses a quartz oscillator to do the timing, the accuracy of the clock in general is worse (i.e. more) than one part in a million, which mean that if the time bias of the clock remains uncorrected, the GNSS receiving system can become unsuitable for its intended purpose. To that end, the GNSS receiving system is used to measure the ranges to different satellites at almost the same time, meaning all the measured ranges have the same time bias error. Ranges with the same error are called pseudoranges. By finding the pseudo-range of an additional fourth satellite for precise position calculation, the time error can also be estimated. Therefore, by having the pseudoranges and the locations of four satellites, the actual receiver's position along the x, y, z axes and the time error $\Delta t$ can be computed accurately.

However, some embodiments are based on recognition that such calculations are accurate as long as receiving satellite signals are accurate. If an intruder or deceiver interferes with the signals, the pseudorange measurements based on unauthentic signals can provide corrupted results. To that end, there is a need to detect the interference and to correct the signal corruption caused by the interference.

Some embodiments are based on realization that the spoofing and meaconing corrupt the time component effecting the pseudorange measurements. For example, the meaconing can delay the satellite signals and thus the GNSS receiving system receives the satellite signal later than expected. Similarly, spoofing may modify transmission time of the satellite signal or position of the satellite that can also be represented as an error of the signal propagation. To that end, in case of satellite signals interference, there is no common time error $\Delta t$ for all satellites. In contrast, there is a common time bias T of the clock and individual time offsets $\alpha_i$ for each satellite. For the authentic signals, the individual time offsets $\alpha_i$ are zero plus noise However, when the signals are corrupted, the individual time offsets are greater than zero. Moreover, if different satellites are affected differently, the individual time offsets are different for different satellites. Some embodiments are based on recognition that difference in individual time offsets can be used to correct the pseudorange measurements.

To that end, due to possible interference, some embodiments represent the clock offset that needs to be corrected as a common clock offset and individual offsets. The common clock offset is the time bias of the clock that needs to found and/or corrected, while the individual offsets are the offsets caused by interference that effects the accuracy of the measurements. In some implementations, the individual offsets are determined for each satellite. Additionally, or alternatively, the individual offsets are determined for each antenna of GNSS receiving system. When individual offsets are different, the difference in the individual offsets causes different errors in pseudorange measurements. Hence, the individual offsets and/or the corresponding pseudorange measurements can be compared with each other to identify and correct that difference to estimate the common offset or time bias of the clock.

In some embodiments, the GNSS receiving system is operatively connected to the time synchronization system through wired or wireless communication channel. The GNSS receiving system includes at least one antenna to receive satellite signals from satellites in sight of the GNSS. As used herein, a satellite is in sight of a GNSS when at least one antenna of the GNSS receiving system can receive a satellite signal transmitted by the satellite. Ideally, the sight should be a line of sight (LOS) to avoid multipath transmission. The GNSS receiving system also includes an internal clock internal to maintain its time, and a processor configured to perform synchronization of the internal clock to a clock of a satellite using the output indicative of time adjustment to the internal clock determined by the time synchronization system of various embodiments.

As used herein, when information is indicative of values, it means that the values included as part of the information can be readily derived from the information. For example, an input indicative of clock offsets means that the clock offsets are part of the input and/or can be readily derived from data of the input. For example, the input can include a time of transmission of a satellite signal according to a clock of a satellite, a time of receiving the satellite signal according to a clock of a GNSS receiving system, and a time of flight of the satellite signal between the position of the satellite and the position of the GNSS receiving system. The time of flight can be indicated by or derived from the positions of the satellite and the GNSS receiving system.

Similarly, output indicative of time adjustment to the internal clock of the GNSS receiving system can include the actual time adjustment and/or any other information from which the time adjustment can be readily derived. For example, the output can identify the satellites that are not corrupt. When GNSS receiving system possesses this information, the GNSS-based systems can readily synchronize its timestamp using authentic satellite signals.

As used herein, similar clock offsets mean that a difference between any pair of clock offsets is less than a threshold. In some embodiments, the threshold is user provided. The threshold can vary between application in dependence on the required accuracy of synchronization, trust in the correctness of the current internal clock of GNSS and other parameters. The threshold can be deterministic, probabilistic, or combination thereof. For example, a probabilistic threshold can be used to estimate the likelihood of dissimilarity of a clock offset, while the deterministic threshold can be used to select similar clock offsets based on that likelihood.

Some embodiments are based on recognition that there is a need to reduce the chances that a deceiver can corrupt satellite signals emitted from different satellites. For example, one embodiment uses the GNSS receiving system that includes directional antennas receiving satellite signals from different satellites. The directional antennas, in contrast with omnidirectional antennas, receive the signal only from a portion of the sky. To that end, a deceiver at a specific location, e.g., on a top of a mountain or a roof of a tall building, can corrupt all satellite signals received by an omnidirectional antenna, but cannot corrupt satellite signals received by directional antennas not covering the location of the deceiver.

The usage of GNSS receiving system with multiple directional antennas is suitable for some applications. However, some embodiments are based on recognition that while it is more difficult to corrupt all satellite signals received by a set of directional antennas, it is still possible to do that with strategic location of multiple deceiver devices. Accordingly, for some application, there is still a need to improve resilience of a time synchronization system to multiple and distributed interference attacks.

One embodiment is based on recognition of independence of the clock offset to various satellite configurations. For example, clock offset is independent from position of a specific satellite, position of a specific GNSS (it should be known, but its value is not important), internal time of GNSS (the value of the offset is unimportant, just should be the same across different satellites), and/or parameters of signal transmission (e.g., angle of arrival). To that end, some embodiments are based on realization that different multiple GNSS receiving systems can cooperatively participate in satellite-based time synchronization to form a distributed and wide area time synchronization system.

For example, in one embodiment, the input received by a time synchronization system includes clock offsets from different GNSS receiving systems. The GNSS receiving systems are located at different locations to prevent deceiver to corrupt all satellite signals received by different GNSS receiving systems. For example, in one embodiment the distance between a pair of GNSS receiving systems is such that each GNSS receiving system is in sight of different combinations of satellites. In such a manner, the deceiver needs to cover virtually impossible large space due to a limited transmission power in interfering GNSS signals received at multiple GNSS receiving systems.

Additionally, or alternatively, in some implementations, which use directional antennas, the probabilities of clock offsets are determined jointly for the clock offsets of satellites in sight of the same antenna. These embodiments are based on recognition that if a deceiver interfere with a satellite signal received by a directional antenna, other satellite signals received by this antenna are probably also corrupted.

In some embodiments, different GNSS receiving systems are synchronized to a common time. For example, the GNSS receiving systems can run a consensus protocol to agree on the common time. In some implementations, the actual value of the common time is not important, because for any value of the common time, the clock offsets determined from authentic signals of different satellites should be similar.

In some embodiments, more than two GNSS receiving systems participate in time synchronization to prevent deceiver to corrupt all satellite signals. However, a large number of GNSS receiving systems is unnecessary for time synchronization and may be complicate the computations. To that end, some embodiments select a pair of GNSS receiving systems for each synchronization procedure and perform synchronization using the selected pair of GNSS receiving systems. The selection can be performed randomly, e.g., according to values produced by a pseudorandom number generator (PRNG) or using any other selection method unknown to potential deceiver since the selection method is shared among GNSS receiving systems. In such a manner, because different pairs of GNSS receiving systems are selected for different synchronization procedures, the deceiver needs to interfere with all satellite signals to ensure that all satellite signals are corrupted. This is virtually impossible when sufficient number of GNSS receiving systems participate in time synchronization. On the other hand, the time synchronization uses only two or a subset of GNSS receiving systems for each synchronization procedure to reduce the computation requirements of time synchronization.

Accordingly, in one embodiment, the processor of the time synchronization system is operatively connected to more than two GNSS receiving systems located at different locations in sight of different combinations of satellites. The processor is configured to select for a synchronization procedure a subset of GNSS receiving systems, such that in a different synchronization procedure a different subset of GNSS receiving systems is selected; and request the clock offsets from the subset of GNSS receiving systems. In some implementations, the processor is configured to select only two GNSS receiving systems for each synchronization procedure to reduce the computation.

One embodiment utilizes the belief propagation as an efficient way to improve the computational efficiency by selecting only a subset of satellites based on the communication links availability. For example, the belief propagation at the tth iteration determines the probability of the clock offset $\alpha_k$, wherein belief is defined as an approximation of marginal probability. A belief propagation is implemented using factor graph of factor nodes and variable nodes. To derive the updated belief, two recursive updates for the variable nodes and their beliefs are as follows. A message from factor node $f_{k,n}$ to variables node $\alpha_k$ denotes the message from nth antenna to the kth antenna. A message, from factor node $f_k$ to variable $\alpha_k$, denotes the message from the kth antenna to itself (indicating prior distribution). Next, the belief is updated based on these messages.

To that end, in one embodiment, the processor of the time synchronization system is configured to execute software components including the Kalman filter configured to determine the clock bias, common across the distributed antennas. The processor jointly works with a set of distributed processing units, in which the belief propagation being utilized to determine the probability of an antenna specific clock offset with respect to probabilities of the other antenna specific clock offsets as a marginal distribution of the other clock offsets conditioned on a set of single difference pseudoranges residuals across all pairs of antennas and the corresponding satellites observed at the respective antennas.

Additionally, or alternatively, some embodiments are based on the recognition that the clock offsets are determined based on measurements of satellite signals and thus are subject to noise. The noise has Gaussian distribution; therefore, it can be advantageous to estimate likelihood of clock offset probabilistically. In addition, because single difference pseudorange residuals are assumed to be Gaussian and includes an additional clock bias term, common to all antennas, some embodiments use Kalman filter to determine the clock bias. Based on the belief propagation estimate of clock offset at each antenna and the known baseline distances across antennas, the pseudoranges are corrected at the distributed processing units, and then Kalman filter is employed at the processor to estimate the clock bias. This embodiment is advantageous, because the Kalman filter yields the exact conditional probability estimate when all errors are Gaussian.

Additionally, or alternatively, some embodiments are based on the recognition that in power grids, phasor measurement units (PMUs) are used in the substations to ensure phase synchronicity among portions of the power distribution network. Phase measurements at each PMU in the network are timestamped with data received from GPS signals. The time stamped measurements are used to compute phase differences among portions of the grid. By analyzing the precise timing of an electrical anomaly as it propagates through the power grid, it is easy to trace back the exact location of any outage in the power network, so that it avoids power outages. However, attackers can relatively easily modify the timestamps leading to power disruption. Thus, securing PMUs against deliberate spoofing, meaconing, or jamming of timing is important. To that end, in one embodiment, the time synchronization system includes a phasor measurement unit configured to synchronize its clock to the internal clock of GNSS.

Accordingly, one embodiment discloses a time synchronization system including an input interface configured to receive pseudorange measurements from a set of antennas of at least one Global Navigation Satellite System (GNSS) receiving system that operates the antennas at known positions according to a clock with an unknown time bias to receive signals from satellites in sight of the antennas; a processor configured to compare the pseudorange measurements of different antennas to produce an antenna-specific clock offset for each of the antennas; correct the pseudorange measurements of the antennas according to the antenna-specific clock offsets of corresponding antennas to produce corrected pseudorange measurements; and determine the time bias of the clock using the corrected pseudorange measurements; and an output interface configured to output the determined time bias.

Another embodiment discloses a time synchronization method, wherein the method uses a processor coupled with stored instructions implementing the method, wherein the instructions, when executed by the processor carry out steps of the method, includes receiving pseudorange measurements from a set of antennas of at least one Global Navigation Satellite System (GNSS) receiving system that operates the antennas at known positions according to a clock with an unknown time bias to receive signals from satellites in sight of the antennas; comparing the pseudorange measurements of different antennas to produce an antenna-specific clock offset for each of the antennas; correcting the pseudorange measurements of the antennas according to the antenna-specific clock offsets of corresponding antennas to produce corrected pseudorange measurements; determining the time bias of the clock using the corrected pseudorange measurements; and correcting the time of the clock using the determined time bias.

Yet another embodiment discloses a non-transitory computer readable storage medium embodied thereon a program executable by a processor for performing a method, the method includes receiving pseudorange measurements from a set of antennas of at least one Global Navigation Satellite System (GNSS) receiving system that operates the antennas at known positions according to a clock with an unknown time bias to receive signals from satellites in sight of the antennas; comparing the pseudorange measurements of different antennas to produce an antenna-specific clock offset for each of the antennas; correcting the pseudorange measurements of the antennas according to the antenna-specific clock offsets of corresponding antennas to produce corrected pseudorange measurements; determining the time bias of the clock using the corrected pseudorange measurements; and outputting the determined time bias.

DETAILED DESCRIPTION

Figure 1A:
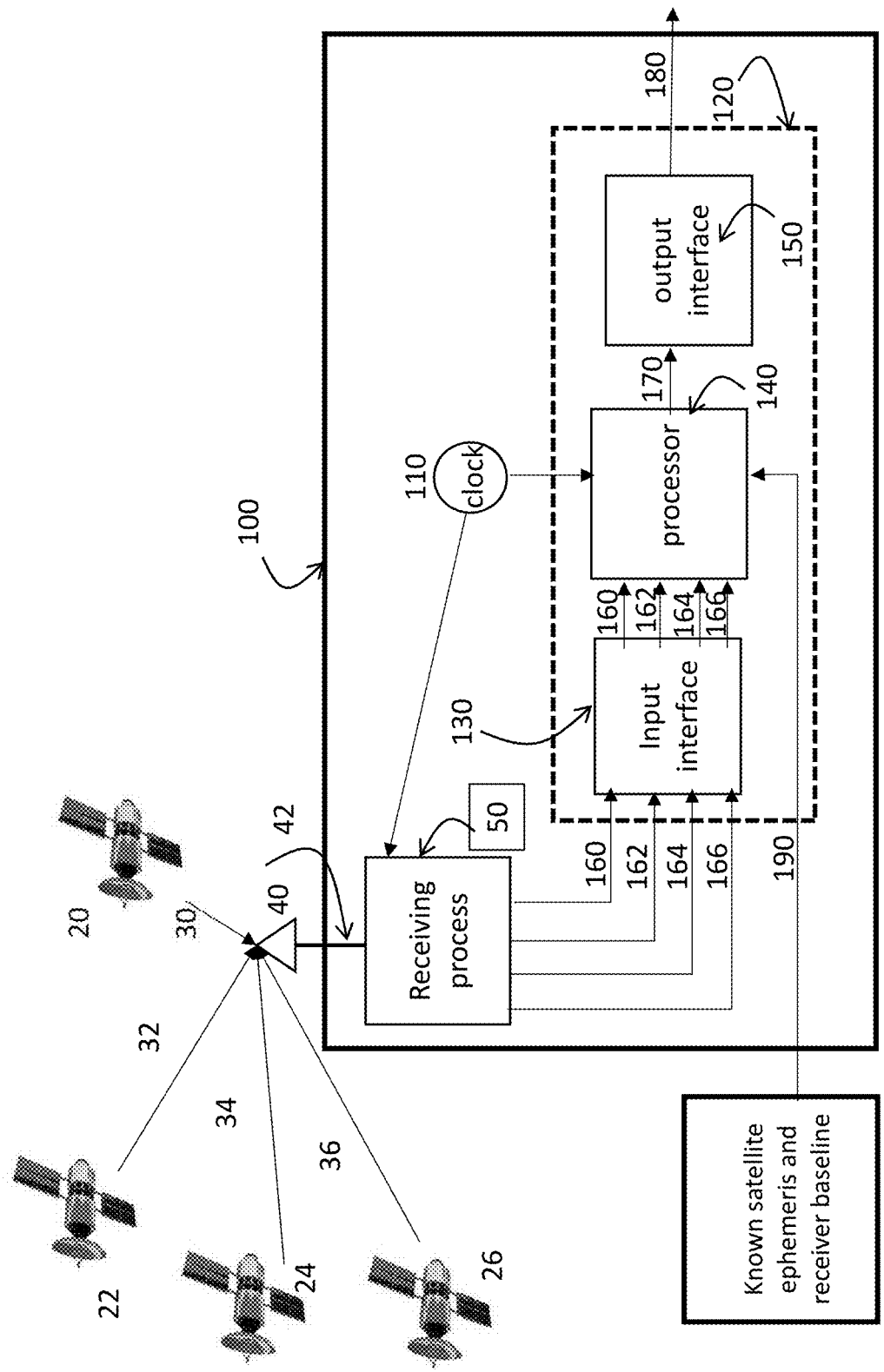
FIG. 1A shows a schematic of a Global Navigation Satellite System (GNSS) receiving system operatively connected to a time synchronization system according to some embodiments.

FIG. 1A shows a schematic of a Global Navigation Satellite System (GNSS) 100 receiving system operatively connected to a time synchronization system 120 according to some embodiments. The GNSS receiving system operates at least one antenna 40 at known position according to a common clock 110 with an unknown time bias to receive signals from satellites in sight of the antennas. It is an object of the time synchronization system 120 to determine the unknown time bias 110 from pseudorange measurements from the antennas even if the antennas are subjected to spoofing and/or meaconing interference.

Each GNSS signal includes information about accurate time and position of the satellite. To know the position and the time of the GNSS receiving system, at least four satellites' signals are necessary. In some implementations, however, the GNSS receiving system is stationary with known positions of antennas. In those implementations, less than four satellites can be used for time synchronization.

After receiving satellite signals, 30, 32, 34, and 36 from a set of satellites, 20, 22, 24, and 26, the antenna forms a composite satellite signal, 42. The receiving process unit, 50, applies a general receiving process for the input signals, and then generates pseudorange measurements, 160, 162, 164, and 166 from each of the satellites. The input interface is the unit that receives the pseudorange measured at the antenna, inside of a time synchronization block, 120, or the unit that receives clock offsets of at least one of the satellites. The GNSS receiving system also includes an internal clock, 110, to trigger the receiving process and to maintain its time. The processor, 140, configured to perform synchronization of the internal clock to a clock of a satellite using time adjustment to the internal clock, 110. The processor is also the unit that detects the clock offset discrepancy from a set of pseudorange measurements, isolates the discrepant clock offsets exhibited in the pseudorange measurements, and estimates the correct GNSS timing for the external devices or applications.

The time synchronization, 120, outputs the corrected and trustable GNSS timing, 180, via an output interface unit, 150. To estimate the correct timing effectively, an additional input, 190, is required at the processor unit, 100. For example, from the satellite orbital model and antenna geometry, the positions of the satellites, 20, 22, 24, and 26, at a particular time, are used as inputs to the processor unit, 140, and the expected number of satellites at the particular location of the GNSS receiving system, 100, respectively.

The pseudorange measurements 160, 162, 164, and 166 indicate the pseudo distance between each satellite 20, 22, 24, 26 and the antenna 40 of the GNSS receiving system. To determine its position, GNSS receiving system determines the ranges to (at least) four satellites as well as their positions at time of transmitting. Knowing the satellites' orbital parameters 190, these positions can be calculated for any point in time. The pseudorange measurements of each satellite are obtained by multiplying the speed of light by the time the signal has taken from the satellite to the receiver. As there are accuracy errors in the time measured, the term pseudo-ranges are used rather than ranges for such distances.

For example, if the clock 110 uses a quartz oscillator to do the timing, the accuracy of the clock 110 in general is worse (i.e. more) than one part in a million, which mean that if the time bias of the clock remains uncorrected, the GNSS receiving system can become unsuitable for its intended purpose. To that end, the GNSS receiving system is used to measure the ranges to different satellites at almost the same time, meaning all the measured ranges have the same time bias error. Ranges with the same error are called pseudoranges. By finding the pseudo-range of an additional fourth satellite for precise position calculation, the time error can also be estimated. Therefore, by having the pseudoranges and the locations of four satellites, the actual receiver's position along the x, y, z axes and the time error Δt can be computed accurately.

However, some embodiments are based on recognition that such calculations are accurate as long as receiving satellite signals are accurate. If an intruder or deceiver interferes with the signals, the pseudorange measurements based on unauthentic signals can provide corrupted results. To that end, there is a need to detect the interference and to correct the signal corruption caused by the interference.

Some embodiments are based on realization that the spoofing and meaconing corrupt the time component effecting the pseudorange measurements. For example, the meaconing can delay the satellite signals and thus the GNSS receiving system receives the satellite signal later than expected. Similarly, spoofing may modify transmission time of the satellite signal or position of the satellite that can also be represented as an error of the signal propagation. To that end, in case of satellite signals interference, there is no common time error Δt for all satellites. In contrast, there is a common time bias T of the clock and individual time offsets $\alpha_i$ for each satellite. For the authentic signals, the individual time offsets $\alpha_i$ are zero. However, when the signals are corrupted, the individual time offsets are greater than zero. Moreover, if different satellites are affected differently, the individual time offsets are different for different satellites. Some embodiments are based on recognition that difference in individual time offsets can be used to correct the pseudorange measurements.

Figure 1B:
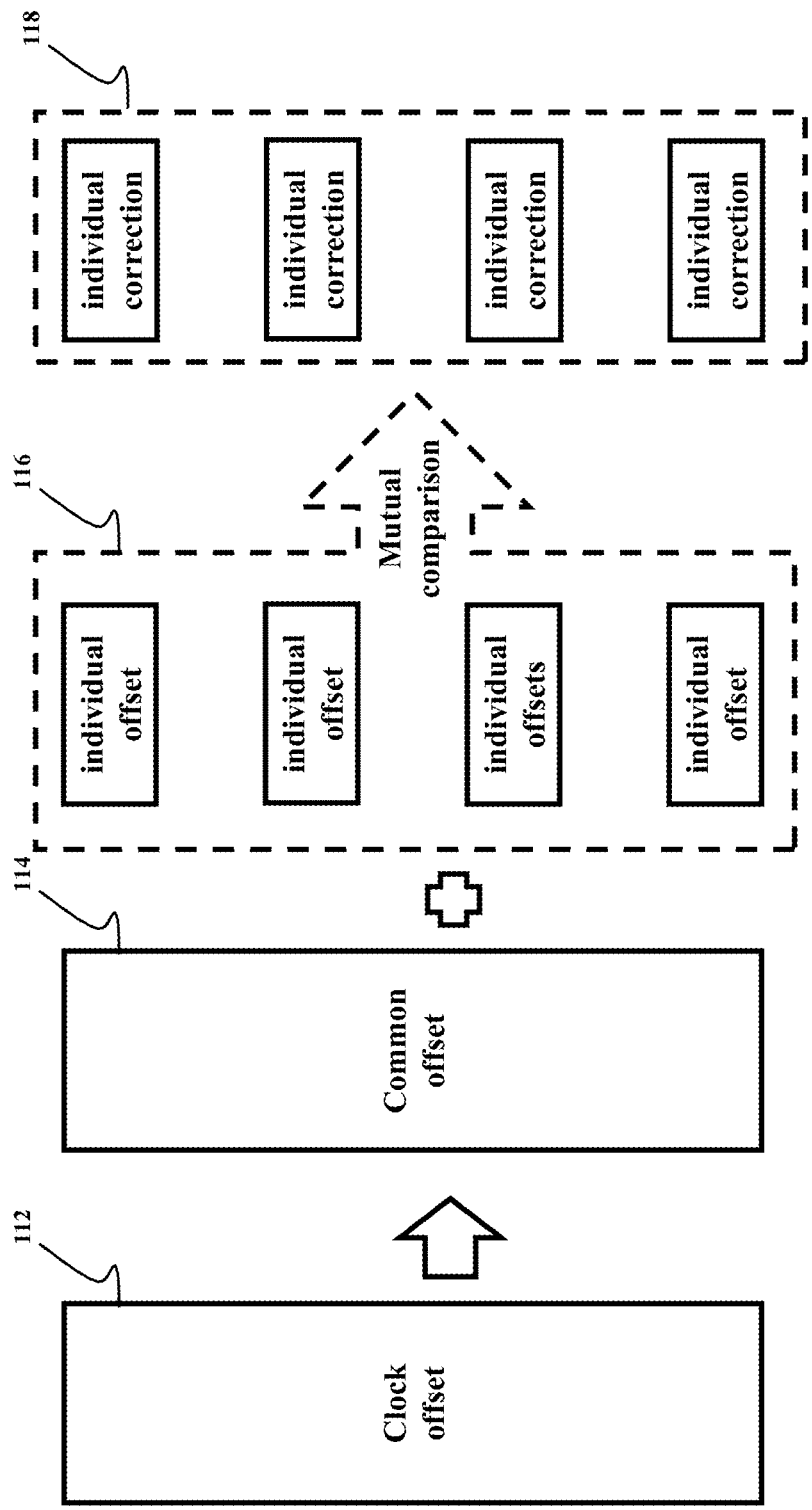
FIG. 1B shows a schematic of some principles used by some embodiments.

FIG. 1B shows a schematic of some principles used by some embodiments. Due to possible interference, the clock offset 112 that needs to be corrected is represented as a common clock offset 114 and individual offsets 116. The common clock offset 114 is the time bias of the clock 110, while the individual offsets 116 are the offsets caused by interference that effect the accuracy of the measurements. In some implementations, the individual offsets are determined for each satellite. Additionally, or alternatively, the individual offsets 116 are determined for each antenna of GNSS receiving system. When individual offsets 116 are different, the difference in the individual offsets causes different errors in pseudorange measurements. Hence, the individual offsets 116 and/or the corresponding pseudorange measurements can be compared with each other to identify and correct 118 that difference to estimate the common offset or time bias 114 of the clock 110.

Figure 2A:
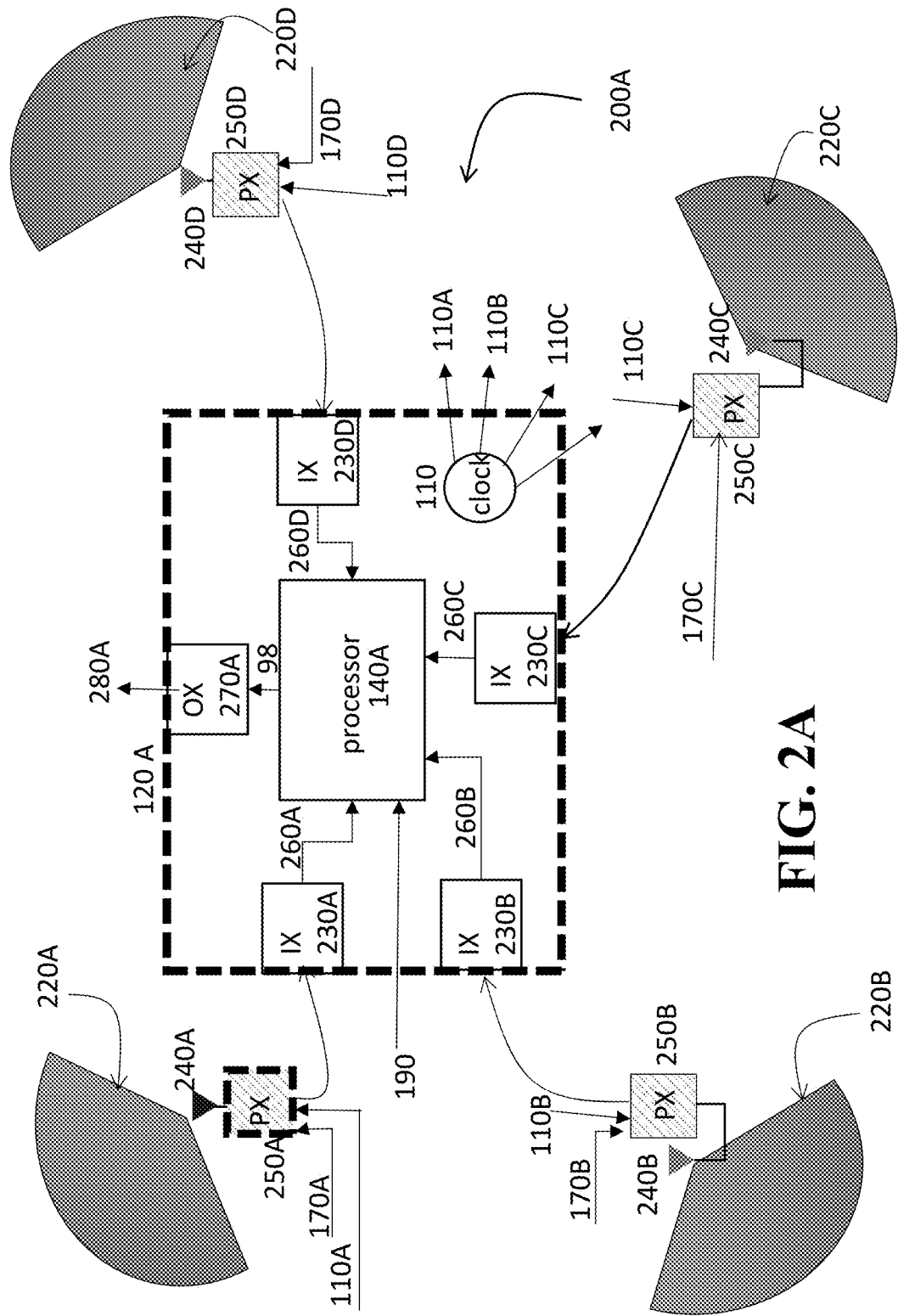
FIG. 2A shows a schematic of GNSS receiving system adapted to correct pseudorange measurements to protect the GNSS timing from the randomly distributed timing attacks according to one embodiment.

FIG. 2A shows a schematic of GNSS receiving system adapted to correct pseudorange measurements to protect the GNSS timing from randomly distributed timing attacks according to one embodiment. This embodiment is based on recognition that while a deceiver or attacker can corrupt any satellite signal emitted by a satellite in a sight of one particular GNSS system, it is more difficult to corrupt multiple satellite signals emitted by different satellites. Thus, a deceiver can corrupt only a subset of total visible satellites. A deceiver at a specific location, e.g., on a top of a mountain or a roof of a tall building, can corrupt all satellite signals received by an omnidirectional antenna, but it is more difficult to corrupt satellite signals received by directional or omnidirectional antennas not covering the location of the deceiver. In any GNSS receiving system, when the attacker is not directly overhead, the number of antennas affected are strictly less than the total number of antennas. Thus, this embodiment is also based on recognition that spatially distributed nature of the directional antennas can be utilized to distinguish deceiver or attacker affecting multiple antennas, including the case where the deceiver or attacker is directly overhead.

Figure 2B:
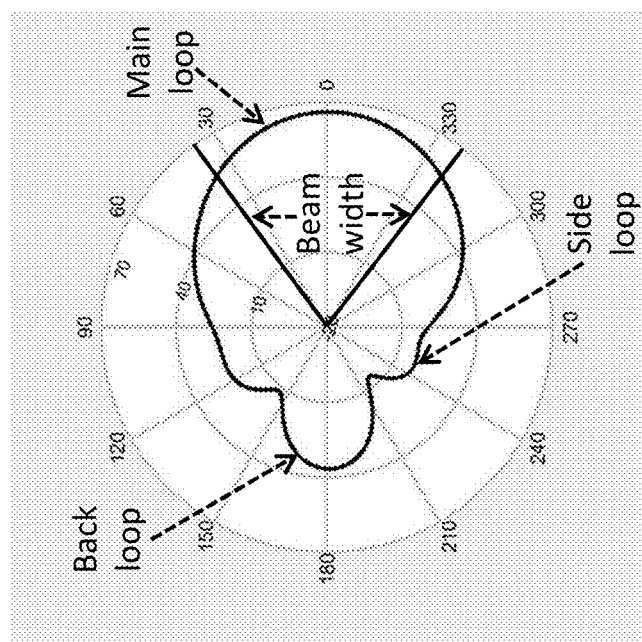
FIG. 2B shows a schematic of a radiation pattern of a directional antenna used by one embodiment.

FIG. 2A is a diagram illustrating a distributed antenna setup 200A used by some embodiments. In this example, a GNSS receiving system uses four directional antennas, 240A, 240B, 240C, and 240D with corresponding fields of view, 220A, 220B, 220C, and 220D. FIG. 2B shows a schematic of a radiation pattern of a directional antenna used by one embodiment. Thus, the directional antennas, in contrast with omnidirectional antennas, receive the signal only from a portion of the sky. However, the same or similar effect can be achieved with strategic locations of omnidirectional antennas as well. To that end, in some implementations, different antennas are in sight of different combinations of satellites.

In the example of FIG. 2A, the geographically distributed multiple directional antennas setup is composed of distributed directional antennas (240A, 240B, 240C, 240D) and accompanying distributed processing units (PXs) (250A, 250B, 250C, 250D), with each antenna pointing towards a different section of the sky, so that each antenna receives satellite signals from only a subset of total visible satellite at a particular time. A selective visibility of the multiple directional antennas places extra burden on the deceiver to corrupt all the antennas simultaneously. To that end, this embodiment determines an individual clock offsets not for the satellites in view of each antenna, but for antennas themselves. In effect, these computations increase accuracy of interference detection and correction.

In some implementations, each directional antenna is connected to or associated with its own processing unit, for example, 250A, 250B, 250C, and 250D. A common clock, 110, triggers theses processing units via connections 110A, 110B, 110C, and 110D, to provide an antenna independent common clock bias. In this embodiment, the time synchronization block, 120A, includes a common and/or separate input interfaces (IXs), 230A, 230B, 230C, and 230D to support the distributed multiple directional antennas setup. Each processing unit, for example, 250A, 250B, 250C, and 250D, provides the corrected antenna specific clock offset, 260A, 260B, 260C, and 260B, exhibited in pseudorange measurements. Hence, the processing units 250A, 250B, 250C, and 250D determine individual time offsets of each antenna and correct the pseudorange measurements to remove the effects of the individual time offsets. However, different implementations use different configurations of the processing units and interfaces.

After having received these antenna specific clock offsets, the processor unit, 140A, computes the common clock bias across the distributed antennas. Thus, this embodiment provides the method to correct the antenna specific clock offsets first, and then enable to estimate the common clock bias. In addition, this embodiment outputs a reliable and trustable GNSS timing, 280A, via the output interface, OX, 270A.

In the present disclosure, the antennas in the GNSS receiving system have a fixed pre-determined geometry and therefore, the corresponding baseline information can be pre-computed and available via connections 170A, 170B, 170C, and 170D. In addition, the GNSS receiving system can be at fixed and known position or at the position determine by various means such as estimated via inertial measurement units or odometers and so on.

To compare satellite signals emitted by different satellites, it is necessary to use a unique parameter out of the GNSS. Some embodiments are based on the realization that different satellite signals carry the same time and when measured using the common clock, the pseudoranges measured at different antennas should exhibit the same antenna specific clock offset when all satellite signals are authentic. For example, when all satellite signals are authentic, pseudoranges measured at 250A, 250B, 250C, and 250D exhibit the same antenna specific clock offset. However, in the event of interference, such as meaconing or spoofing, the affected satellites should exhibit different antenna specific timing errors. Thus, one of the embodiments of this disclosure is to use the antenna specific clock offsets as a comparison metric to detect the event of interference.

The pseudorange measured at the kth antenna corresponding to the ith satellite is expressed as follows:

$$\rho_k^i = \|x_1 - b_{1k} - y^i\| + (c \cdot T + c \cdot \alpha k - c \cdot \delta t^i) + I_k^i + w_k^i, \quad (1)$$

where $x_1$ denotes the three-dimensional (3D) position of the first antenna, 240A, $b_{1k}$ denotes the pre-computed baseline vectors between the kth antenna and the first antenna, 240A thereby defining the position of the kth antenna. The speed of light is denoted by c. Ephemeris information for all visible satellites is available to the processor 140A via 190. Thus, 170A, 170B, 170C, and 170D, have the same function as that of 190 in FIG. 1B. Pre-computed baselines between two antennas are available from the inputs of 170A, 170B, 170C, and 170D. Also, $y^i$ and $\delta t^i$ respectively denote the 3D position and the clock bias of the ith satellite. The atmospheric errors $I_k^i$ related to ionosphere and troposphere are estimated by using existing methods. Ephemeris information for satellites visible at the kth antenna and correction parameters for ionosphere and troposphere delays can be available via 170A, 170B, 170C, and 170D, and $w_k^i$ represents the additive Gaussian noise in the corresponding satellite measurements. Given that a clock, 110, triggers the antennas, the corresponding clock bias T is independent of the antenna considered, i.e., the same for all antennas. Let the antenna-specific clock offset in pseudoranges measured at the kth antenna be denoted by $\alpha_k$. Hence, a time offset at kth antenna is $T + \alpha_k$, wherein T is the unknown time bias of the common clock and $\alpha_k$ is antenna-specific clock offset. Some embodiments are based on realization that by comparing the pseudorange measurements of different antennas it is possible to determine an antenna-specific clock offset for each of the antennas.

Figure 3:
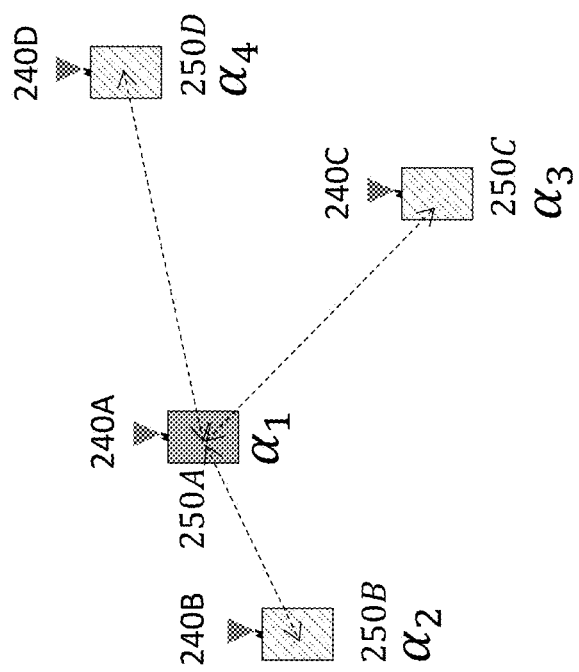
FIG. 3 shows one exemplar schematic of detecting antenna-specific clock offsets according to some embodiments.

FIG. 3 shows one exemplar schematic of detecting antenna-specific clock offsets according to some embodiments. For example, an antenna effected by deceptive interference exhibits a different clock offset as compared to other non-affected antennas. For four distributed processing units, 250A, 250B, 250C, and 250D, let us assume that only antenna 240A receives the pseudoranges from affected satellites. Then processing unit 250A in cooperation with the processing units 250B, 250C, and 250D can compute $|\alpha_1 - \alpha_2| \neq 0$, $|\alpha_1 - \alpha_3| \neq 0$, $|\alpha_1 - \alpha_4| \neq 0$ as well as $|\alpha_3 - \alpha_2| \approx 0$, $|\alpha_3 - \alpha_4| \approx 0$, and $|\alpha_4 - \alpha_2| \approx 0$. In this example, it is possible to compute a pair of antenna-specific clock offset differences. After this computation, each processing unit reports to the processor to authenticate the GNSS receiving system. Or, the processor, 140A, can detect also via its inputs, 260A, 260B, 260C, and 260D.

For example, during meaconing, the number of received satellites' signal can be larger than the pre-determined number of satellite signal. Thus, some embodiments also compare the pre-determined number of satellites' signal and the observed number of satellites' signal. With the aid of additional input signals, 170A, 170B, 170C, and 170D, which include the expected number of satellite signal for each antenna, the affected antenna can be detected at the distributed processing units. Each processing unit can report the status of its antenna to the processor unit via 260A, 260B, 260C, and 260D.

Estimation of Antenna-Specific Clock Offsets

Figure 4A:
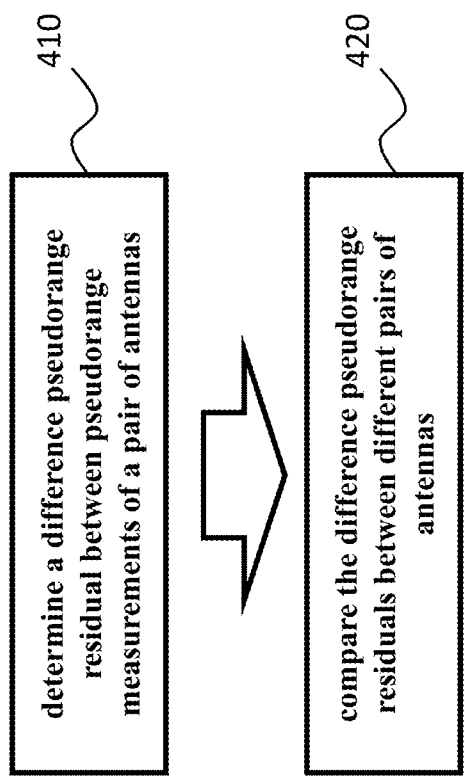
FIG. 4A shows a block diagram of a method for determining the antenna-specific clock offsets according to some embodiments.

FIG. 4A shows a block diagram of a method for determining the antenna-specific clock offsets according to some embodiments. The embodiments determine 410, for each pair of antennas of the GNSS receiving system, a difference pseudorange residual between pseudorange measurements of a pair of antennas and compare 420 the difference pseudorange residuals between different pairs of antennas to produce the antenna-specific clock offset for each of the antennas.

A pseudorange residual removes known components from the pseudorange measurement of the antenna. For example, the pseudorange residual removes components related to a known position of the antenna. In addition, the difference pseudorange residual between the pair of antennas removes common components in the pseudorange measurements of the pair of antennas. For example, the difference pseudorange residual removes components related to unknown, but common time offset bias of the clock. Hence, the difference pseudorange residual includes a difference between the antenna-specific clock offsets of the pair of antennas subject to noise, because the antenna-specific clock offsets are neither known nor common for different antennas.

For example, to estimate the unknown clock offsets at each antenna, some embodiments compute the difference pseudorange residual between the ith visible satellite from the kth antenna with that of the jth visible satellite from the nth antenna as $$\gamma_{kn}^{ij} \equiv \frac{1}{c}((\rho_k^i - \|\hat{x}_1 - b_{1k} - y^i\| + c \cdot \delta t^i) - (\rho_n^j - \|\hat{x}_1 - b_{1n} - y^j\| + c \cdot \delta T^j)), \quad (2)$$

where $\hat{x}_1$ is the estimate of the 3D position of the first antenna, 240A. Known satellite ephemeris such as $y^i$ and $\delta t^i$ is available at 250A via 170A, $b_{1k}$ is the known 3D baseline between the first antenna, 240A, and antenna k.

With some computations, equation (2) represents a difference between antenna-specific clock offsets of the kth antenna and the nth antenna for satellites i and j according to $$\gamma_{kn}^{ij} = \alpha_k - \alpha_n + w_{kn}^{ij}, \quad (3)$$

where noise $$w_{kn}^{ij} \equiv \frac{1}{c}(w_k^i - w_n^j).$$

The difference pseudorange residual, $\gamma_{kn}^{ij} \approx 0$, due to the presence of only uncorrelated noise observed at the kth and nth antennas when ith satellite and jth satellite provide authentic signals. However, either of satellites provides affected signal by either meaconing or spoofing, then $\gamma_{kn}^{ij}$ will show non-zero errors greater than a threshold.

To that end, some embodiments use independence of the clock offset to various satellite configurations to detect and correct the interference. For example, clock offset is independent from position of a specific satellite, position of a specific GNSS (it should be known, but its value is not important), internal time of GNSS (the value of the offset is unimportant, just should be the same across different satellites), and/or parameters of signal transmission (e.g., angle of arrival). To that end, some embodiments compare all satellites of each antenna to improve robustness of the comparison.

For example, one embodiment compares the difference pseudorange residuals while ignoring the noise or by sampling the noise on a known distribution of the noise. This embodiment simplifies computation. Additionally, or alternatively, one embodiment determines the difference pseudorange residuals probabilistically to consider effect of the noise on the measurements.

For example, to increase accuracy of estimation across all pairs of antennas, processing units, k and n, compute the corresponding likelihood probability of similarity of $a_k$ and $a_n$ according to a Gaussian model for single difference residual as follows:

$$p(\gamma_{kn} \mid \alpha_k, \alpha_n) = \frac{1}{\sqrt{(2\pi v^2)^{L_k L_n}}} \exp\left\{ -\frac{L_k L_n}{2v^2} \left( \frac{1^T \gamma_{kn}}{L_k L_n} + (\alpha_k - \alpha_n) \right)^2 \right\}, \quad (4)$$

where $\gamma_{kn}$ denotes the metric across all pairs of antennas and the corresponding satellites observed at the respective antennas; $L_k$ and $L_n$ respectively denote the total number of visible satellites at the kth and nth antennas; 1 denotes all one vector; and $v^2$ denotes the measurement variance of the summation of single difference residual components which comprises of errors observed due to pseudoranges, satellite ephemeris errors, and errors in predicted position and velocity. In the embodiment, distributed processing units, 250A, 250B, 250C, and 250D, compute equation (4) depending on a pair of antennas. For example, equation (4) is computed at the kth and nth processing units. As can be seen from equation (4), if $a_k$ and $a_n$ are different, the indication of likelihood probability $p(\gamma_{kn}|\alpha_k, \alpha_n)$ becomes smaller. Otherwise, the indication $p(\gamma_{kn}|\alpha_k, \alpha_n)$ becomes bigger. In effect, the probabilistic determination allows to consider uncertainty of the measurements to increase the accuracy of the offset comparison.

Figure 4B:
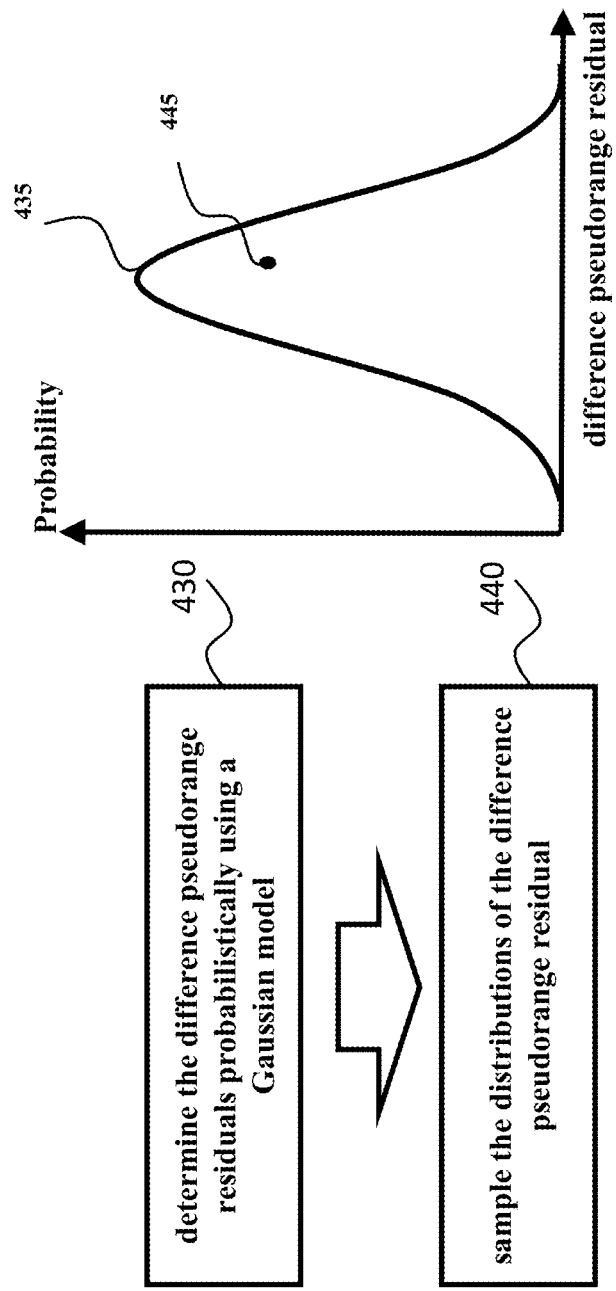
FIG. 4B shows a schematic of probabilistic determination of the difference pseudorange residuals according to one embodiment.

FIG. 4B shows a schematic of probabilistic determination of the difference pseudorange residuals according to one embodiment. The embodiment determines 430 the difference pseudorange residuals probabilistically using a Gaussian model 435 of Equation (4) for a distribution of the difference pseudorange residual of a pair of antennas according to pseudorange measurements from all satellites in sight of the pair of antennas and samples 440 the distributions of the difference pseudorange residual of each pair of antennas to produce the antenna-specific clock offset for each of the antennas by comparing the sampled difference pseudorange residuals 445. In effect, this embodiment jointly determines the antenna-specific clock offsets using all visible satellites in the presence of noise.

Additionally, or alternatively, to estimate the unknown clock offset at each antenna, one embodiment of this disclosure is to estimate via the marginal distribution. This is because the marginal distribution of a single antenna allows to estimate the clock offset of that antenna with respect of ion consideration of the clock offsets of other antennas. This is advantageous because in authentic case all values of all clock offsets form all antennas should be the same Given M distributed directional antennas, the joint posterior distribution of all clock offsets of all antennas is given by $p(\alpha_1, \ldots, \alpha_M | \gamma_{kn})$. The corresponding marginal distribution of antenna k, denoted by $g(\alpha_k)$, is given by $$g(\alpha_k) = \int_{\alpha_1, \ldots, \alpha_{k-1}} \int_{\alpha_{k+1}, \ldots, \alpha_M} p(\alpha_1, \ldots, \alpha_M | \{\gamma_{kn}\}_{k=1, \ldots, M, n \in B_k}) d\alpha_1 \cdots d\alpha_{k-1} d\alpha_{k+1} \cdots d\alpha_M, \quad (5)$$

where $B_k$ denotes the set of all antenna excluding the kth antenna. In this embodiment, each of the processing units, 250A, 250B, 250C, and 250D, computes its own marginal distribution. For example, the kth processing unit computes equation (5).

Hence, some embodiments produce the antenna-specific clock offset by determining a probability of the antenna-specific clock offset of each antenna with respect to probabilities of the antenna-specific clock offsets of other antennas as a marginal distribution of the antenna-specific clock offset of each antenna conditioned on a joint posteriori distribution of the antenna-specific clock offsets of all antennas. For example, the antenna-specific clock offsets are determined based on the corresponding marginal distributions of the antenna-specific clock offsets.

Some embodiments are based on recognition that with an increase in the number of antennas, M, in the GNSS receiving system, equation (5) becomes computationally challenging. Some embodiments, however, utilize the factor graph framework, for every variable node $\alpha_k$, to calculate a computationally-efficient marginal distribution, $b_t(\alpha_k)$, at every time instant t. Specifically, some embodiments determine the belief of antenna-specific clock offset, $b_t(\alpha_k)$, at the kth processing unit as the product of its prior distribution and all the incoming messages from other antennas in the distributed multiple directional antenna setup.

Figure 5A:
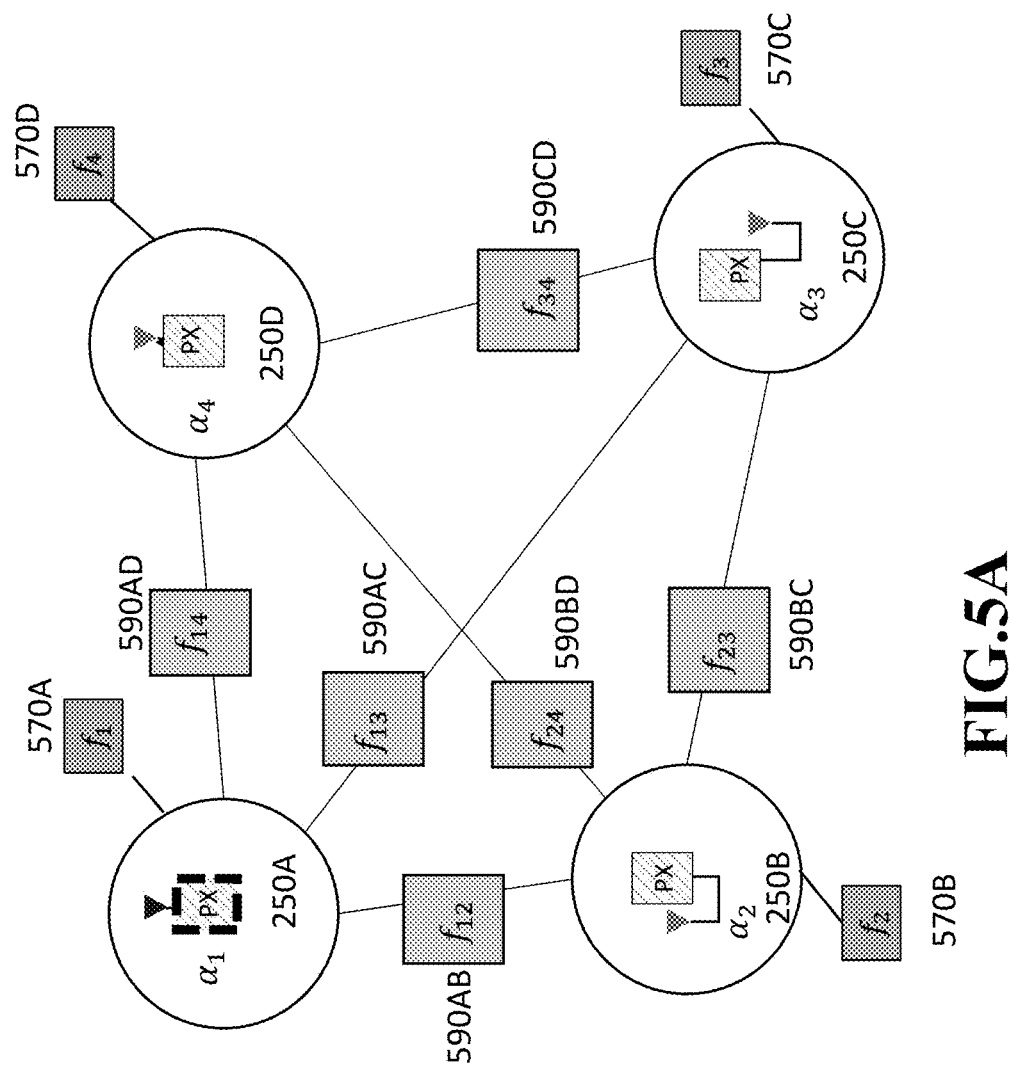
FIG. 5A shows an exemplar factor graph used to estimate the unknown antenna-specific clock by some embodiments.

FIG. 5A shows an exemplar factor graph used to estimate the unknown antenna-specific clock offsets, e.g., $\alpha_1$, $\alpha_2$, $\alpha_3$, and $\alpha_4$, by some embodiments. Each antenna and its accompanying processing unit, for example, 240A and 250A has unknown variable node $\alpha_1$, and its prior distribution 570A. Similarly, 240D and 250D has unknown variable node $\alpha_4$, and its prior distribution $f_4$, 270D. A factor node $f_{kn}$ is placed between the kth and nth antennas. For example, $f_{13}$, 590AC, is a factor node between the 1st antenna and the 3rd antenna. Similarly, other factor nodes can be specified.

The belief of the clock offset measured at the kth antenna, $b_t(\alpha_k)$, is computed by the following equation:

$$b_t(\alpha_k) = m_{f_k \to \alpha_k} \prod_{n \in B_k} m_{f_{kn} \to \alpha_k}(\alpha_k), \quad (6)$$

where the factor node $f_{kn}$ connects two variable nodes $\alpha_k$ and $\alpha_n$ based on the likelihood probability $p(\gamma_{kn}|\alpha_k, \alpha_n)$ and the other factor node $f_k$, which connects to its corresponding variable node $\alpha_k$, and indicates the prior distribution of $\alpha_k$.

Figure 5B:
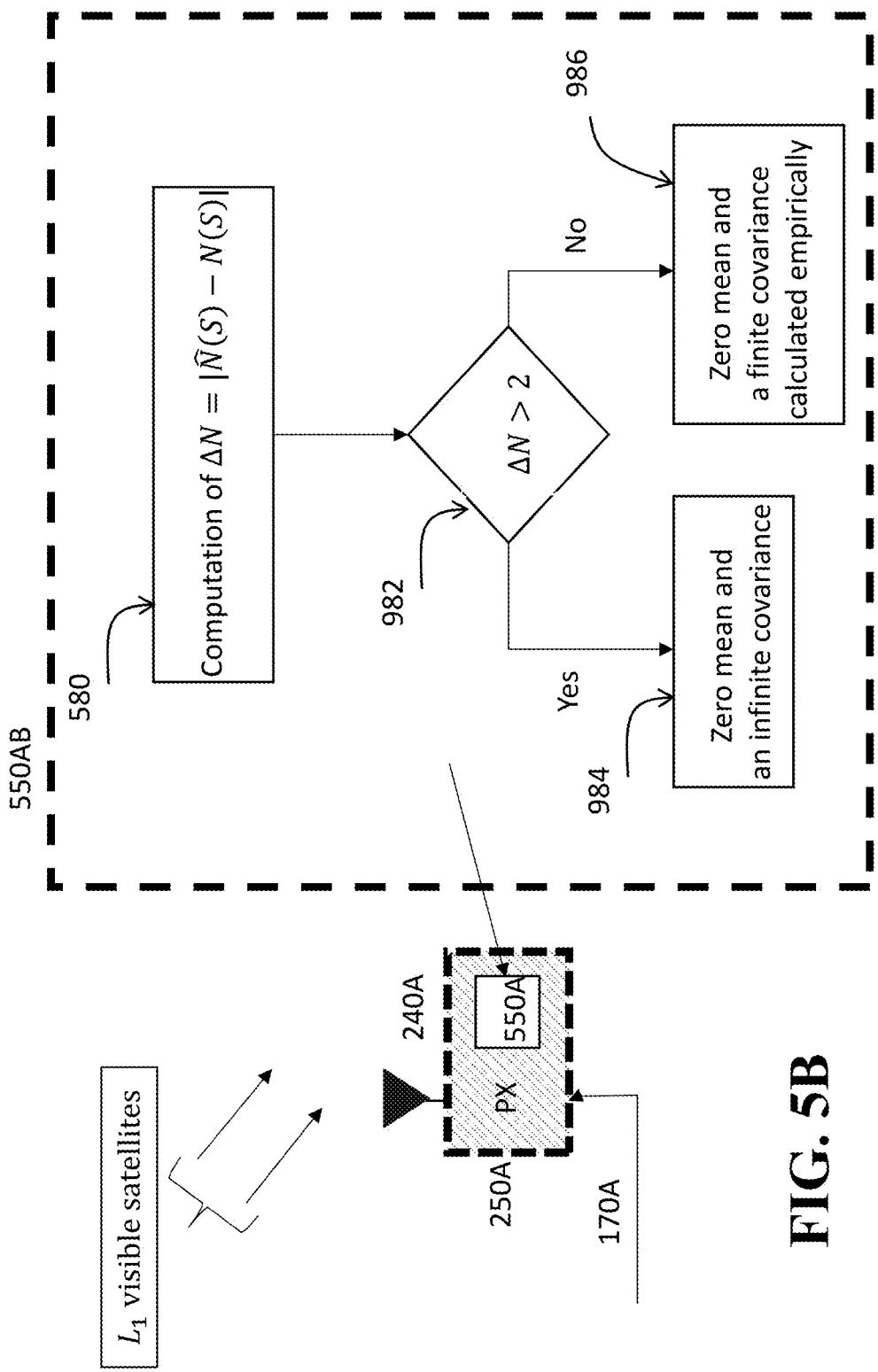
FIG. 5B shows a schematic of principles of computation and/or initialization of prior distribution of antenna-specific clock offset according to one embodiment.

FIG. 5B shows a schematic of principles of computation and/or initialization of prior distribution of antenna-specific clock offset $\alpha_1$ according to one embodiment. This embodiment takes a number of visible satellites in sight of the antenna 240A into the consideration to increase the accuracy of computation. The expected number of satellites for the first antenna, 240A, $\hat{N}(S)$, is provided by a link 170A; and the number of satellites measured (visible) by antenna 240A is computed as $N(S)=L_1$, where $L_1$ indicates the number of satellites tracked by processing unit. After the computation of difference between the expected and visible satellites, i.e., $\Delta N=|L_1-\hat{N}(S)|$, 580, an initialization process, 550AB, determines the mean and covariance depending the value of N. For example, in one embodiment considers on whether $\Delta N>2$ or not, 982. If $\Delta N>2$, the considered antenna, 240A, is recognized that interference attacks this antenna by this embodiment, so that a zero mean and an infinite covariance are used, 984, to approximate a uniform distribution. Otherwise, a zero mean and a finite covariance are used, 986, wherein the covariance is empirically estimated from the previous timestamps. The processing unit, 250A, installs this embodiment as 550A. The processing unit, 250A, computes similar prior distributions for other antennas, 240B, 240C, and 240D.

Figure 6:
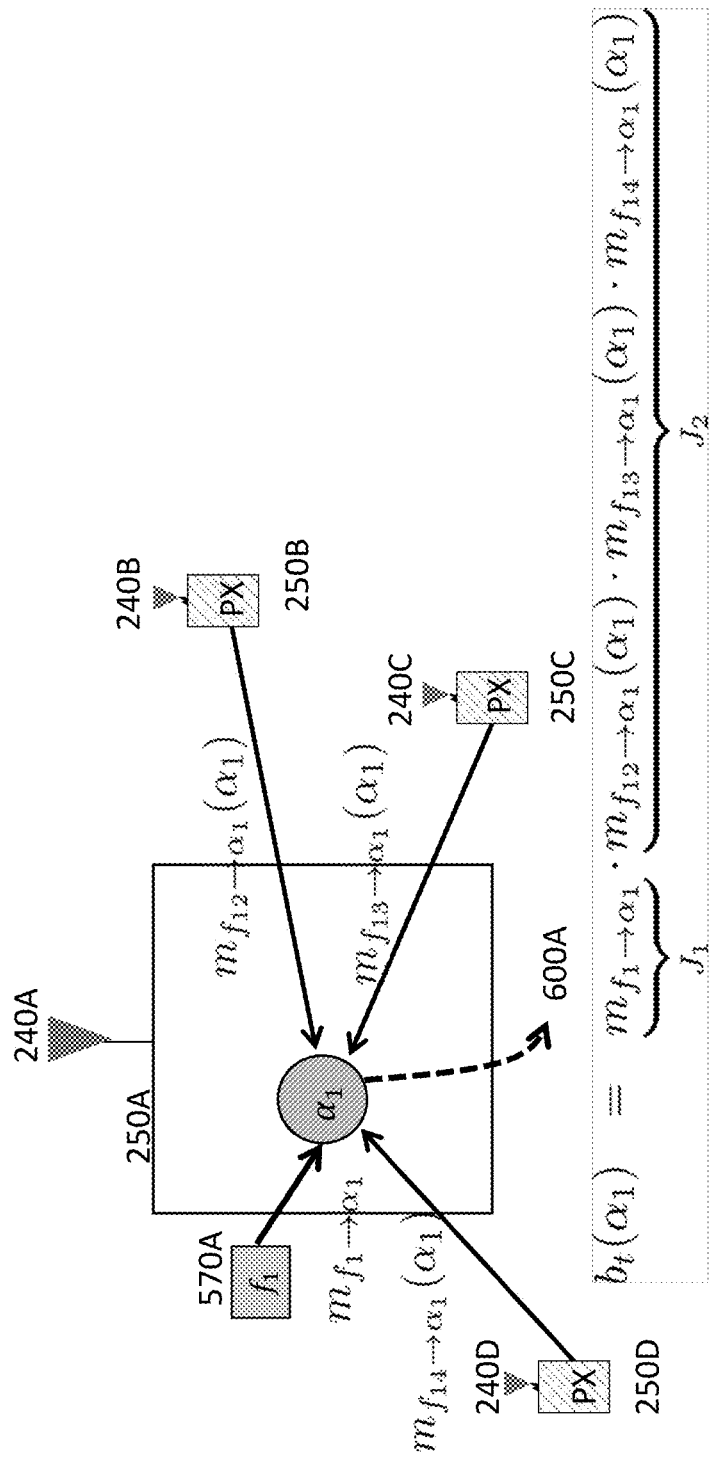
FIG. 6 shows a schematic of computation of a probabilistic belief on the marginal distribution of the antenna-specific clock offset according to one embodiment.

FIG. 6 shows a schematic of computation of a probabilistic belief $b_t(\alpha_k)$ at time t on the marginal distribution of the antenna-specific clock offset $\alpha_k$ according to one embodiment. For example, the belief $b_t(\alpha_1)$ 600A is computed as the belief of the clock offset measured at 240A. The message $m_{f_{12} \to \alpha_1}$ indicates the belief of the clock offset measured at 240B on the variable node $\alpha_1$ based on the factor node $f_{12}$ calculated via $$p(\gamma_{12}|\alpha_1, \alpha_2) = \frac{1}{\sqrt{(2\pi v^2)^{L_1 L_2}}} \exp\left\{\frac{-L_1 L_2}{2v^2}\left(\frac{1^T \gamma_{12}}{L_1 L_2} + (\alpha_1 - \alpha_2)\right)^2\right\},$$

where $\gamma_{12}$ denotes the residual metric across a pair of antennas, k=1, and 2, and the corresponding satellites observed at the respective antennas; $L_1$ and $L_2$ respectively denote the total number of visible satellites at the first and second antennas; 1 denotes all one vector. Considering three its neighboring antennas, 240B, 240C, and 240D, processing unit 250A computes $J_2$ and then multiply it by $J_1$, which is the belief of the clock offset measured at 240A. After the computation of the belief $b_t(\alpha_1)$, 600A, the second processing unit 250B computes the belief on $\alpha_2$. After finishing the computation of the last antenna's belief on the clock offset, it is necessary to update the message $m_{f_{kn} \to \alpha_k}(\alpha_k)$ the beliefs on the clock offsets are updated. In general, $m_{f_{kn} \to \alpha_k}(\alpha_k)$ can be updated as follows:

$$m_{f_{kn} \to \alpha_k}(\alpha_k) = \int p(\gamma_{kn}|\alpha_k, \alpha_n) b_t(\alpha_n) d\alpha_n. \quad (7)$$

Figure 7:
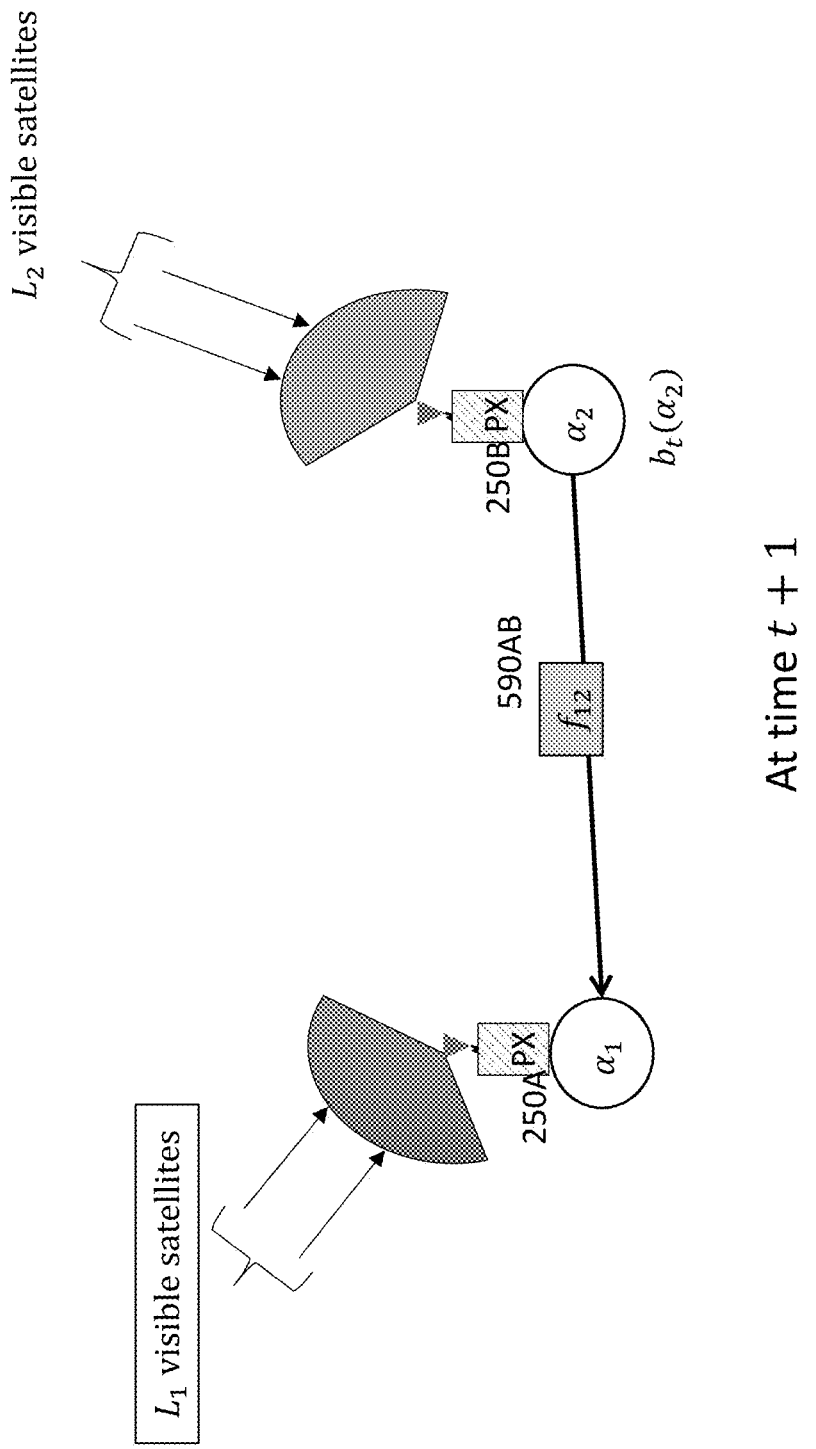
FIG. 7 shows a schematic of updating propagated messages according to some embodiments.

FIG. 7 shows a schematic of updating propagated messages $m_{f_{12} \to \alpha_1}(\alpha_1)$ based on equation (7) according to some embodiments. In some implementations, each processing unit compute its own belief after receiving beliefs weighted by likelihoods from its neighboring processing units, and then update the weights for its neighboring processing units.

Figure 8:
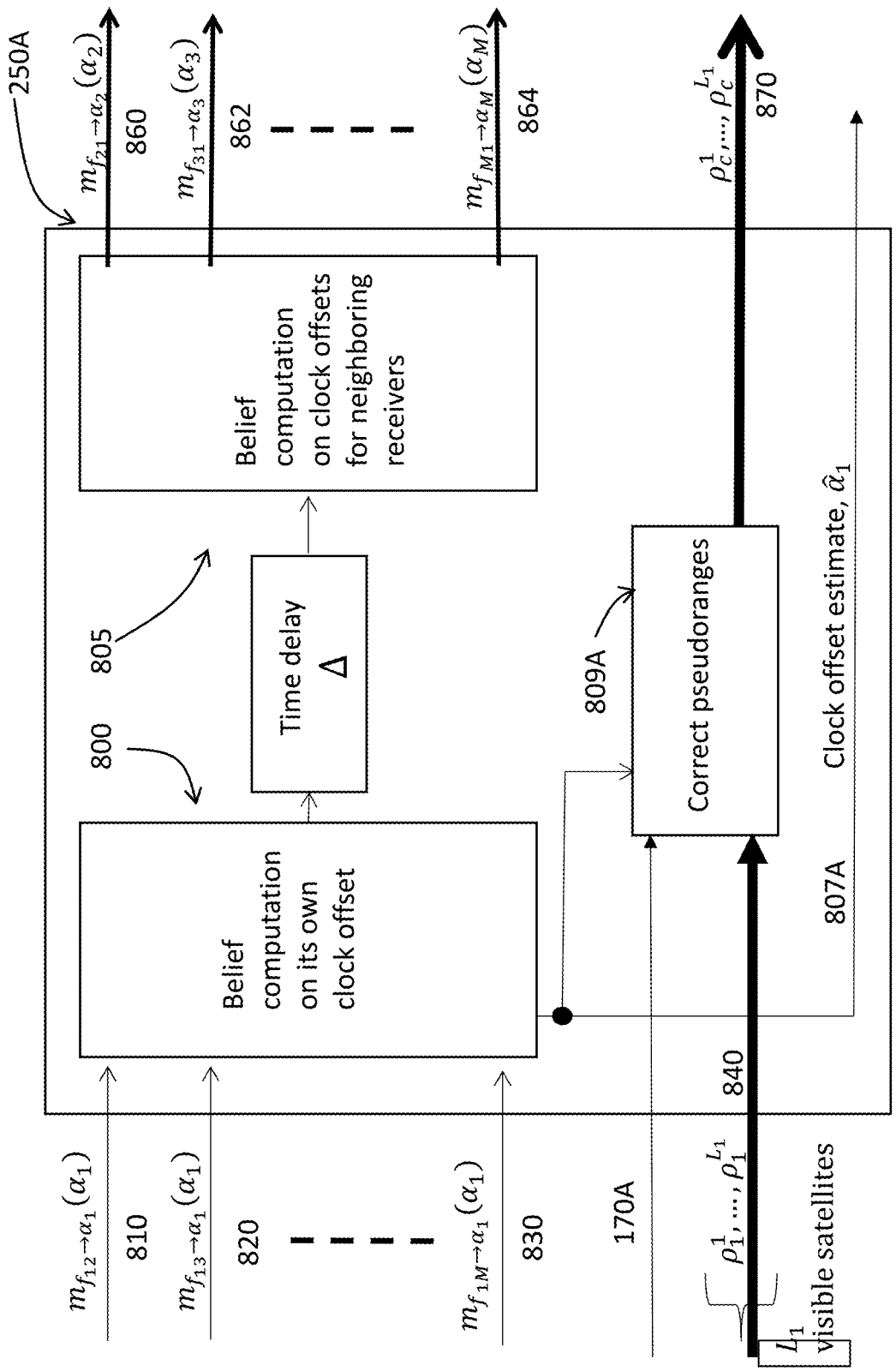
FIG. 8 shows a block diagram of operations performed by at each processing unit of a system of FIG. 2A according to some embodiments.

FIG. 8 shows a block diagram of operations performed by at each processing unit of a system of FIG. 2A according to some embodiments. For example, the processing unit, 250A, receives the messages from neighboring processing units, $m_{f_{12} \to \alpha_1}(\alpha_1)$, 810, $m_{f_{13} \to \alpha_1}(\alpha_1)$ 820, and $m_{f_{1M} \to \alpha_1}(\alpha_1)$, 830. Using these inputs, the processing unit, 250A, computes its own belief on its own clock offset in 800, according to equation (6). After a specific time delay, the processing unit, 250A, compute the beliefs on the clock offset for its neighboring processing units, $m_{f_{21} \to \alpha_2}(\alpha_2)$, 860, $m_{f_{31} \to \alpha_3}(\alpha_3)$, 862, and $m_{f_{M1} \to \alpha_M}(\alpha_M)$, 864, in processing block 805. After several iterations between 800 and 805, processing unit 250A outputs the antenna specific clock offset estimate, $\hat{\alpha}_1$, 807A. A similar operation is accomplished at other processing units, 250B, 250C, and 250D. Thus, some embodiments replace the need for one trusted device being used for the time synchronization by incorporating multiple distributed antennas and their accompanying distributed processing units.

Pseudorange Measurements Corrections

From equation (1), two time-relevant variables, $\alpha_k$ and T, exist from the pseudoranges measured at the kth antenna. Upon applying the distributed clock offset estimation, antenna specific clock offset estimates are available from one of the embodiments, for example as illustrated in FIG. 8.

Thus, another embodiment updates equation (1) as follows:

$$\rho_{k,t}^i = \|x_{1,t} - b_{1k} - y_t^i\| + (c \cdot T_r + c \cdot \hat{\alpha}_k - c \cdot \delta t^i) + I_k^i + w_k^j \quad (8)$$

$$= h_{k,t}(x_{1,t}, y_t^i, T_t, b_{1k}) + c \cdot \hat{\alpha}_k$$

where $h_{k,t}(\bullet)$ denotes the measurement model of the kth antenna and time t. In contrast to equation (1), three variables, $x_1$, $y^i$, and T, in equation (8) are also indexed by time t. Recall that $x_1$ denotes the 3D position of the first antenna, 240A, $b_{1k}$ denotes the 3D baseline from the first antenna, 240A, to the kth antenna. $y^i$ denotes the 3D position of the ith satellite. In this embodiment, each receiver of 250A, 250B, 250C, and 250D, computes the corrected pseudoranges as $$\rho_c^i = \rho_{k,t}^i - c \cdot \hat{\alpha}_k. \quad (9)$$

For pseudoranges measured at antenna 240A, specified by 840 in FIG. 8, the correct pseudoranges unit, 809A, computes equation (9) for $L_1$ pseudoranges measured at antenna 240A. The correct pseudoranges unit, 809A, also outputs the corrected pseudoranges, 870 with size $L_1$. Thus, the processing unit 250A, outputs both the antenna specific clock offset estimate, $\hat{\alpha}_1$, 807A, and corrected pseudoranges, 870. As used herein, $L \equiv L_1 + \ldots + L_M$, specifies the total number of visible satellites. Recall that $L_k$ denotes the number of visible satellites at antenna k.

Kalman estimates the clock bias probabilistically. Hence, some embodiments use one- or two-steps probabilistic corrections when the antenna specific clock offset is also estimated probabilistically. Because the characteristics of the common clock bias is different from the antenna-specific clock offset, some embodiments use separate probabilistic corrections.

Estimation of Common Time Bias

Some embodiments are based on recognition that after the corrected pseudorange measurements are determined, a number of different techniques can be used to estimate a common clock bias. Some embodiments, for example, use Kalman filter to estimate the clock bias. Kalman filter takes in consideration the probabilistic nature of pseudorange corrections using antenna-specific clock offsets. In effect, the Kalman filter increase accuracy of time estimation/synchronization.

Figure 9:
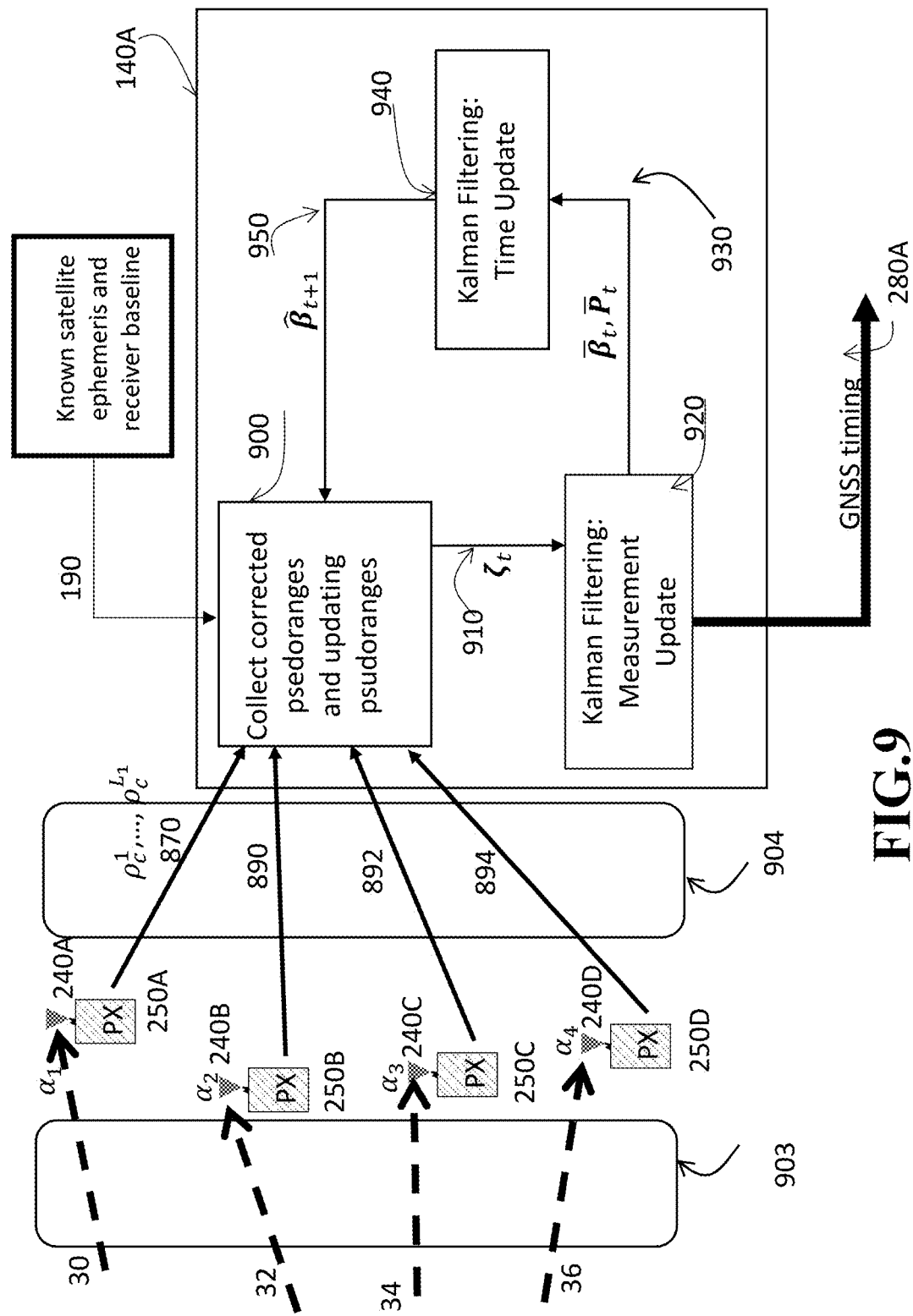
FIG. 9 shows a schematic of time synchronization using Kalman filter according to some embodiments.

FIG. 9 shows a schematic of time synchronization using Kalman filter according to some embodiments. These embodiments adaptively propagate the 3D position, 3D velocity, clock bias, and clock drift of antenna 240A, via the Kalman filter (KF) and compute the corrected 3D position and 3D velocity of other antennas, 240B, 240C, and 240D, using the known fixed baseline information specified by $b_{kn} = x_k - x_n$, where $x_k$ and $x_n$ respectively, denote the 3D positions for kth and nth antennas.

From a set of distributed processing units, the processor, 140A, receives a set of corrected pseudoranges, 870, 890, 892, and 894. Depending on the number of visible satellites at each of the antennas, 240B, 240C, and 240D, the signals, 890, 892, and 894, is determined. For example, 890 has $L_2$ corrected pseudoranges; 892 has $L_3$ corrected pseudoranges; and 894 has $L_4$ corrected pseudoranges.

After receiving these corrected pseudoranges, the collecting corrected pseudoranges and updating pseudoranges unit, 900, makes a measurement vector, $\zeta_t$, 910, whose dimension is L, with an aid from known satellite ephemeris available via 190. For this measurement vector, the processor, 140A, applies measurement update and time update of the Kalman filter.

In the embodiment, the state vector β, at time t, is specified as follows:

$$\beta = [x_1, T, v_1, \dot{T}]_t^T$$

where $x_1$ denotes the 3D position of antenna 240A, T is the common clock bias across the antennas, $v_1$ denotes the 3D velocity of antenna 240A, and 1' denotes the clock drift.

The dynamic model of the considered GNSS receiving system and state covariance matrix are respectively given by $$F = \begin{bmatrix} I_{4\times4} & \delta t \, I_{4\times4} \\ 0_{4\times4} & I_{4\times4} \end{bmatrix} \text{ and } Q_t = F \begin{bmatrix} 0_{4\times4} & \delta t \, I_{4\times4} \\ 0_{4\times4} & \kappa \end{bmatrix}$$

where $$\kappa = \begin{bmatrix} 0_{3\times3} & 0 \\ 0 & c\tau \end{bmatrix}$$

with τ representing the Allan's deviation of the front-end oscillator, and δt representing the update interval of the adaptive Kalman step. From equation (8), the measurement model, $H_t$, is given by $$H_t = \frac{\partial h_t(\beta_t)}{\partial \beta_t}\bigg|_{\hat{\beta}_t} \text{ with } h_t(\beta_t) = [h_k(x_{1,t}, T_t, y_t^i, b_{1k}) \forall \, i \in L_k, k \in M].$$

For the corrected pseudoranges, the adaptive measurement noise covariance matrix is given by $R_t$.

Based on these specified quantities, the measurement update unit, 820, procedures as follows:

$$\overline{\beta}_t = (I_{8\times8} - K_t H_t)\hat{\beta}_t + K_t \zeta_t,$$

$$\overline{P}_t = (I_{8\times8} - K_t H_t)\hat{P}_t,$$

$$K_t = \hat{P}_t H_t^T (H_t \hat{P}_t H_t^T + R_t)^{-1},$$

$$\in_t = \zeta_t - h_t(\overline{\beta}_t), \text{ and}$$

$$R_{t+1} = dR_t + (1-d)(\in_t^T \in_t + H_t \hat{P}_t H_t^T),$$

where $\hat{P}_t$ denotes the predicted state covariance matrix, from which corrected state covariance matrix $\overline{P}_t$ is computed. In addition, $K_t$ denotes the Kalman gain. This embodiment adaptively estimates the measurement noise covariance matrix $R_t$ by assessing the post-residual vector $\in_t$ and considering the forgetting factor as d=0.3.

Having used corrected state vector, $\overline{\beta}_t$, and its corresponding state covariance matrix, $\overline{P}_t$, 930, the time update unit, 940, predicts the next instant state vector using a dynamic model F and a static process noise covariance $Q_t$ given by $$\hat{\beta}_{t+1} = F\overline{\beta}_t \text{ and } \hat{P}_{t+1} = F\overline{P}_t F^T + Q_t.$$

The predicted state vector, $\hat{\beta}_{t+1}$, is then used to correct the corrected pseudoranges at the previous instantaneous time. Known satellite ephemeris and receiver baseline available from the input, 190, are also used in this computation. That is, the collecting corrected pseudoranges and updating pseudoranges unit, 900, update the corrected pseudoranges as follows:

$$\rho_c{}^i = h_{k,t+1}(\hat{x}_{1,t+1}, \hat{T}_{t+1}, y_t^i, b_{1k}) + c \cdot \hat{\alpha}_k. \qquad (10)$$

After achieving convergence by the closed-loop adaptive tracking by KF, the measurement update unit, 920, outputs a trustable and reliable GNSS timing, 940.

FIG. 9 shows an interaction of software components of the time synchronization system operatively connected to a GNSS receiving system according to some embodiments. Firstly, the signals received from GNSS satellites, 30, 32, 34, and 36, at each antenna are conditioned to obtain a metric, relevant to clock offsets, which is denoted by operation 903. For example, Equation (2) describes this operation. Secondly, a distributed processing is executed by the distributed processors, 250A, 250B, 250C, and 250D, namely, belief propagation, to detect the attack status of the GNSS receiving system and estimate the corresponding timing errors of each antenna induced by the attacker, which is denoted by operation 904. Lastly, Kalman Filter is executed by the processor, 104A, to utilize the estimated timing errors and obtain the GNSS timing for the GNSS receiving system.

In summarizing, some embodiments provide methods for detecting interference attack, isolating interference attack and correcting timing error exhibited by interference attack. The timing estimated by some embodiments, even during interference attack, does not drift over time and maintain reliable timing accuracy.

Multiple GNSS Receiving Systems Covering Wide Area

The usage of GNSS receiving system with multiple directional antennas is suitable for some applications. However, some embodiments are based on the recognition that while it is more difficult to corrupt all satellite signals received by a set of directional antennas, it is still possible to do that with strategic location of multiple deceiver devices. Accordingly, for some application, there is still a need to improve resilience of a time synchronization system to multiple and distributed interference attacks.

Figure 10:
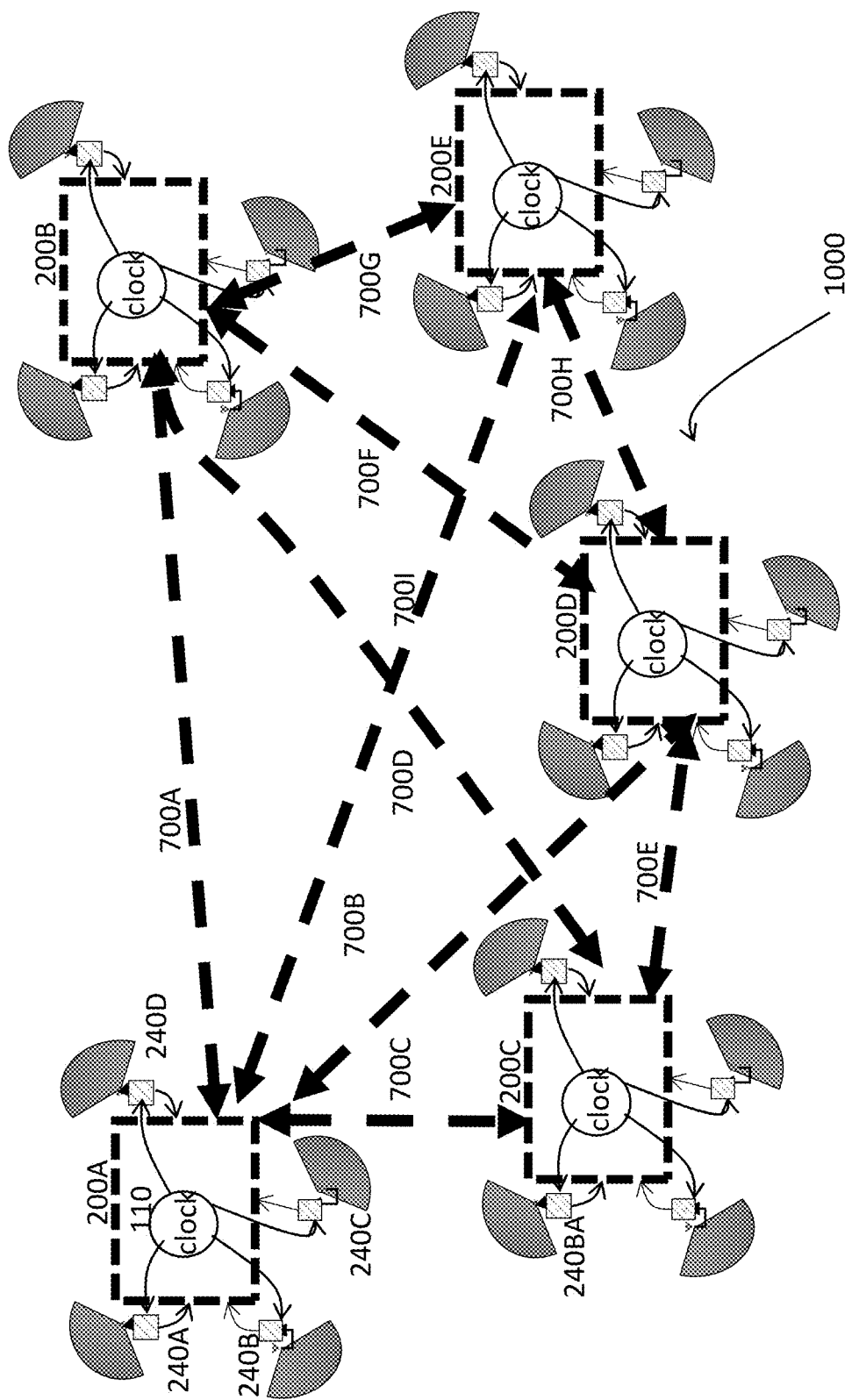
FIG. 10 shows a schematic of geographically distributed GNSS receiving systems according to one embodiment.

FIG. 10 shows a schematic of geographically distributed GNSS receiving systems according to one embodiment. The GNSS receiving systems are located at different locations to prevent deceiver to corrupt all satellite signals received by a single GNSS receiving system. For example, in one embodiment, the distance between a pair of GNSS receiving systems is such that each GNSS receiving system is in sight of different combinations of satellites. In such a manner, the deceiver needs to cover virtually impossibly large space due to a limited transmission power in interfering GNSS signals received at multiple GNSS receiving systems.

This exemplar embodiment shows five GNSS receiving systems, 200A, 200B, 200C, 200D, and 200E are placed at five different locations. Each of GNSS receiving systems employs the same geographically distributed multiple directional antennas setup, which is one of the embodiments of this disclosure. Without description their operation in detail, they have the same operation as those embodiments for the single GNSS receiving system. There are two-way communication links across the wide-area network of GNSS receiving systems, 700A-700I.

The GNSS receiving system is operatively connected to the wide-area time synchronization system, 1000, through the existing/established wired or wireless communication links, 700A-700G. Each GNSS receiving system is connected to at least one other GNSS receiving system in the same wide-area network. Given the limited range of the deceiving attacks, such as jamming or spoofing, it is very problematic for an attacker to simultaneously affect two geographically dispersed GNSS receiving systems. Therefore, utilizing a wide-area network to authenticate different GNSS receiving systems removes the need for the presence of a trusted reference station. In addition, more are the number of GNSS receiving systems in the wide-area network, lower is the probability of the associated false alarm and mis-detection. The GNSS receiving systems can have omnidirectional or directional antennas. The GNSS receiving systems can have one or multiple antennas. The GNSS receiving systems can have the same or different numbers of antennas.

One embodiment is based on the recognition of independence of the clock offset to various satellite configurations. For example, clock offset is independent from position of a specific satellite, position of a specific GNSS (it should be known, but its value is not important), the place of GNSS receiving systems such as 200A, 200B, 200C, 200D, and 200E, illustrated in FIG. 10, internal time of GNSS (the value of the offset is unimportant, just should be the same across different satellites), and/or parameters of signal transmission (e.g., angle of arrival). To that end, some embodiments are based on realization that different multiple GNSS receiving systems can cooperatively participate in satellite-based time synchronization to form a distributed and wide area time synchronization system.

For example, in one embodiment, the input received by a time synchronization system includes clock offsets from different GNSS receiving systems. The GNSS receiving systems are located at different locations to prevent deceiver to corrupt all satellite signals received by different GNSS receiving systems. For example, in one embodiment the distance between a pair of GNSS receiving systems is such that each GNSS receiving system is in sight of different combinations of satellites. Hence, only one GNSS receiving system, for example, 200A, can practically be attacked by the deceiver at each instance of time. Since the deceiver has a limited transmission power to interfere satellite signals received at multiple GNSS receiving systems, the deceiver is virtually impossible to cover large space.

Additionally, or alternatively, in some implementations, which use directional antennas, the probabilities of clock offsets are determined jointly for the clock offsets of satellites in sight of the same antenna. These embodiments are based on recognition that if a deceiver interfere with a satellite signal received by a directional antenna, other satellite signals received by this antenna are probably also corrupted.

As a single GNSS receiving system, 200A, an input to the wide-area time synchronization system, 1000, is indicative of the clock offsets, which means that the clock offsets can be readily derived from the input data. For example, the input can include a time of transmission of a satellite signal according to a clock of a satellite, a time of receiving the satellite signal according to a clock of a GNSS receiving system, and a time of flight of the satellite signal between the position of the satellite and the position of the GNSS receiving system. The time of flight can be indicated by or derived from the positions of the satellite and the GNSS receiving system.

As a single GNSS receiving system, 200A, output indicative of time adjustment to the internal clock of the GNSS receiving system can include the actual time adjustment and/or any other information from which the time adjustment can be readily derived. For example, the output can identify the satellites that are not corrupt and/or estimate the offset between internal clock and the clock on-board the GNSS satellites.

In the present disclosure, one embodiment provides the method that each GNSS receiving system in the wide-area time synchronization system employs a distributed framework to evaluate its authenticity, rather than a centralized architecture. By implementing a fully distributed framework, it is possible to efficiently utilize the already in place communication platform across the wide-area network, thereby preventing the vulnerabilities due to single point failures. The computational requirements are significantly lowered and so are the associated latencies incurred, which is a critical aspect for the real-time decision making processes of the safety-critical applications.

One embodiment utilizes a factor-graph based belief propagation framework to detect the timing attacks and estimate the corresponding timing errors. In the context of wide-area network, the marginal distribution $g(\alpha_k)$ computed via joint posterior distribution. Similar to equation (5), one embodiment utilizes updated equation (5) for wide-area time synchronization system. We estimate the antenna-specific timing errors by comparing the single difference pseudorange residuals across antennas in the same GNSS receiving system, for example, between 240A and 240B, and across antennas in widely-dispersed power substations, for example, between 240A and 240BA.

As one example, let us assume that N GNSS receiving systems are serviced in the wide area network and $M_a$ distributed antennas are placed at the ath GNSS receiving system with fixed and known baseline vectors across GNSS receiving systems. Similarly, $M_b$ antennas are placed at the bth GNSS receiving system. As a single GNSS receiving system, 200A, based on the known ephemeris, provided by 170A, 170B, 170C, 170D, and 190, and the predicted position, velocity and clock of the antennas, i.e., $\hat{x}_{k,t}$ and $\hat{T}_{k,t}$, one of the embodiments computes the metric $\gamma_{kn,t} = \{\gamma_{kn,t}^{ij}, \forall k,n \in \{1, \ldots, M\}, k \neq n\ i \in L_{k,t}, j \in L_{n,t}\}$ across all pairs of antennas and the corresponding satellites observed at the respective antennas. After accounting for atmospheric effects, $\gamma_{kn,t}^{ij}$ is equivalent to $$\gamma_{kn,t}^{ij} \equiv \alpha_k - \alpha_n = \begin{cases} 0, & k, n \in \{1, \ldots, M_a\}, \\ \beta_{ab}, & k \in \{1, \ldots, M_a\}, n \in \{1, \ldots, M_b\}, \end{cases} \quad (11)$$

where in authentic conditions, $\gamma_{kn,t}^{ij} \approx 0$ across any two antennas that belong to the same GNSS receiving system, that is, the kth and nth antennas belong to the same GNSS receiving system due to the distributed antennas being triggered by the same clock. For example, FIG. 10 shows that clock 110 triggers a set of distributed antennas, 240A (first antenna), 240B (second antenna), 240C (third antenna), and 240D (fourth antenna). In addition, the ith and jth visible satellites at GNSS receiving system, 200A, are not affected by an active deceiving, then at a particular time, $\gamma_{kn,t}^{ij} \approx 0$. However, $\gamma_{kn,t}^{ij} \approx \beta_{ab}$ across antennas that belong to different GNSS receiving systems. For example, the kth antenna denotes 240A in 240A, whereas the nth antenna denotes 240BA in 240C, then $\beta_{ab}$ is the unknown clock offset residual between two GNSS receiving systems to which the kth and nth antennas belong. If we number GNSS receiving systems as 200A, the first receiving system, 200B, the second receiving system, 200C, the third receiving system, 200D, the fourth receiving system, and 200E, the fifth receiving system, then for the two considered antennas, 240A and 240BA, $\gamma_{kn,t}^{ij} \approx \beta_{13}$.

The general wide-area network setup can provide the following advantages. Due to using a larger number of spatially distributed antennas, correlation between errors will be lower, so that a lower false alarm and missed detection probability can be possible. This setup overcomes the case where interference attacks all the antennas in one GNSS receiving system.

In some embodiments, different GNSS receiving systems are synchronized to a common time. For example, the GNSS receiving systems can run a consensus protocol to agree on the common time. In some implementations, the actual value of the common time is not important, because for any value of the common time, the clock offsets determined from authentic signals of different satellites should be similar. For example, without needing the actual value of $\beta_{ab}$, a similarity metric based on the estimated clock offsets is calculated via consensus protocol, i.e., across the antennas in the same GNSS receiving system, $\alpha_k - \alpha_{n_1} \approx \alpha_k - \alpha_{n_2}$, $\forall k, n_1, n_2 \in \{1, \ldots, M_a\}$, and across antennas in different GNSS receiving systems, $\alpha_k - \alpha_{n_1} \approx \alpha_k - \alpha_{n_2}$, $\forall k \in \{1, \ldots, M_a\}$, $\forall n_1, n_2 \in \{1, \ldots, M_a\}$.

According to the embodiment accounting for the single GNSS receiving system, the distributed processing units need to update their belief based on the single difference pseudorange residuals and the belief estimates of the other antennas, which is given by $$b_t(\alpha_k) = m_{f_k \to \alpha_k} \prod_{n \in B_k} m_{f_{kn} \to \alpha_k}(\alpha_k), \quad (6)$$

where $B_k \in \{1 \ldots, M_1\} \cup \ldots \cup \{1 \ldots, M_N\} - k$, which is extended from that of the single GNSS receiving system. Applying the similar embodiments described for the single GNSS receiving system, the belief propagation framework can be executed to estimate the clock offset errors observed for each antenna in the wide-area network.

Across any two GNSS receiving systems with an established communication link, messages are exchanged to transmit the following information, i.e., the number of antennas, GNSS satellites observed and expected at each antenna, and the associated pseudoranges. Additionally, the belief of the antenna specific clock offset error computed via belief propagation is also transmitted. Secured communication links are utilized for the reliable transfer of information across the two geographically distributed GNSS receiving systems.

The use of belief computation and its propagation on the distributed multiple directional antennas setup provides the following advantages. By implementing a fully distributed architecture, it is possible to efficiently utilize the already in place communication platform across wide-area network. Highly computational extensive calculation of marginal distribution is simplified through distributed algorithm, namely, belief propagation. Belief propagation helps ensuring accuracy while reducing latency in spoofing detection, which is advantageous for timing related applications. The use of belief computation and its propagation is scalable to any number of directional antennas within the GNSS receiving system.

Furthermore, the similarity in the antenna-specific clock offset errors are compared either against a user threshold that can be set manually or via deterministic, probabilistic, or combinatory-based approaches. For example, a probabilistic threshold can be used to estimate the likelihood of dissimilarity of a clock offset, while the deterministic threshold can be used to select similar clock offsets based on that likelihood. Based on this, each GNSS receiving system in the wide-area time synchronization system simultaneously authenticates its attack status at any instant, while incurring a reasonably efficient computational load. When GNSS receiving system possesses this information, the GNSS-based systems can readily synchronize its timestamp using authentic satellite signals.

In addition to detecting the attack status, in some embodiments, the processor unit mitigates the effect of attacks by utilizing the estimated antenna-specific timing errors, and employing a closed-loop adaptive tracking Kalman Filter, which were described by several embodiments via FIG. 9.

To that end, some of the embodiments provide the following solutions. Multiple locations are all collectively authenticated. Some of the embodiments can lower the sensitivity of prior distribution in the calculation of unknown antenna-specific clock offset errors as compared to using just one GNSS receiving system. The methods of some embodiments are more resilient when multiple antennas in the same GNSS receiving system are affected by spoofing. Utilizing other GNSS receivers' available information, some of the embodiments enable accurate detection/estimation of timing errors in each antenna across the GNSS receiving systems.

Figure 11:
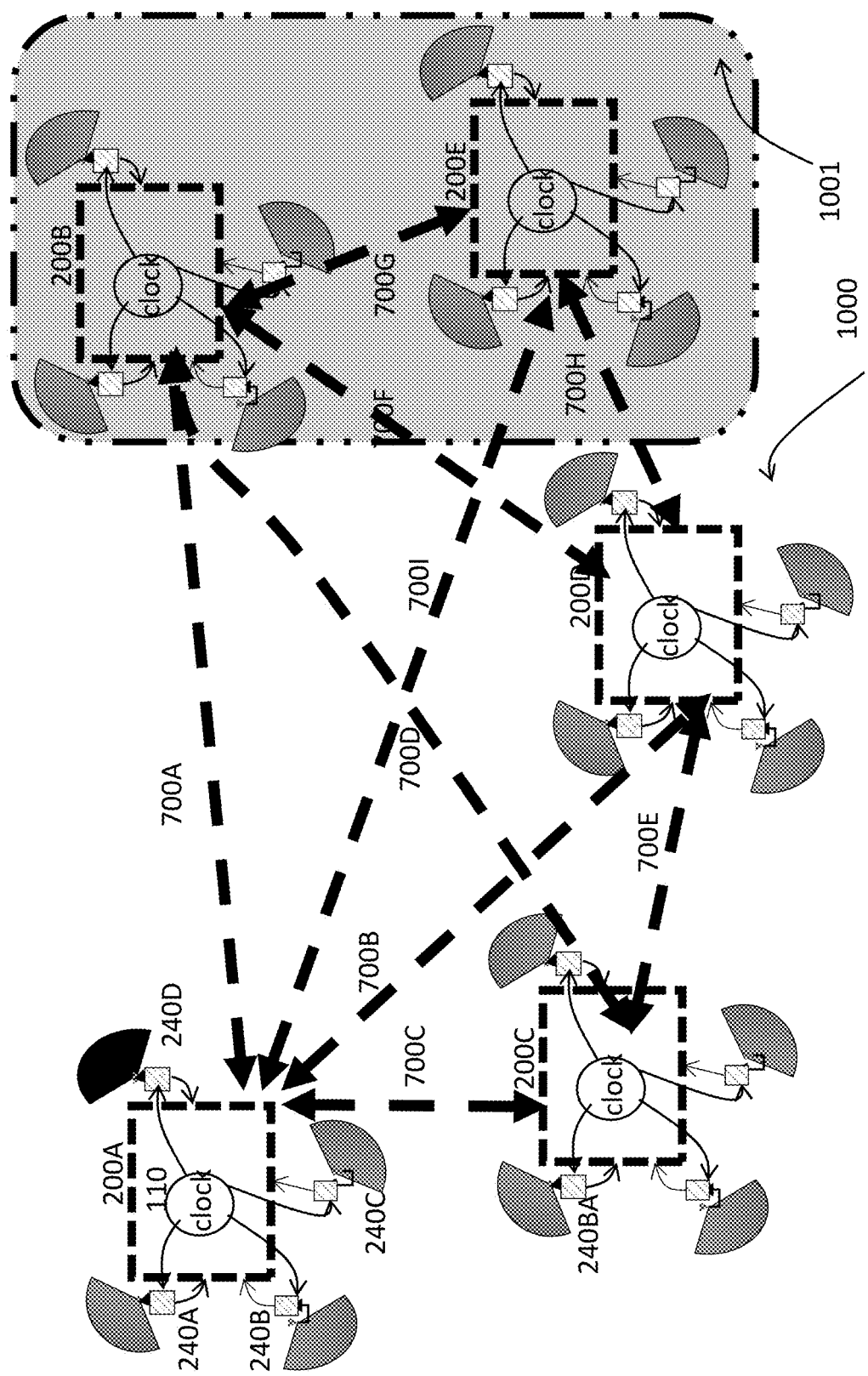
FIG. 11 shows a schematic of an interference attack detected by one embodiment.

FIG. 11 shows a schematic of an interference attack detected by one embodiment. In this exemplar embodiment, one of the antennas, 240D, at the first GNSS receiving system, 200A, is affected by interference attack. In this case, other three processor units of 200B, 200C, and 200D, can find that the receiving system 200A is affected by interference attack. Thus, removing 200A, the second GNSS receiving system, 200B, can make time synchronization with the fourth GNSS receiving system, 200D. By considering only one additional GNSS receiving system, the size of the set, $B_k$, is reduced, so that this embodiment can reduce the complexity of the belief propagation.

Figure 12:
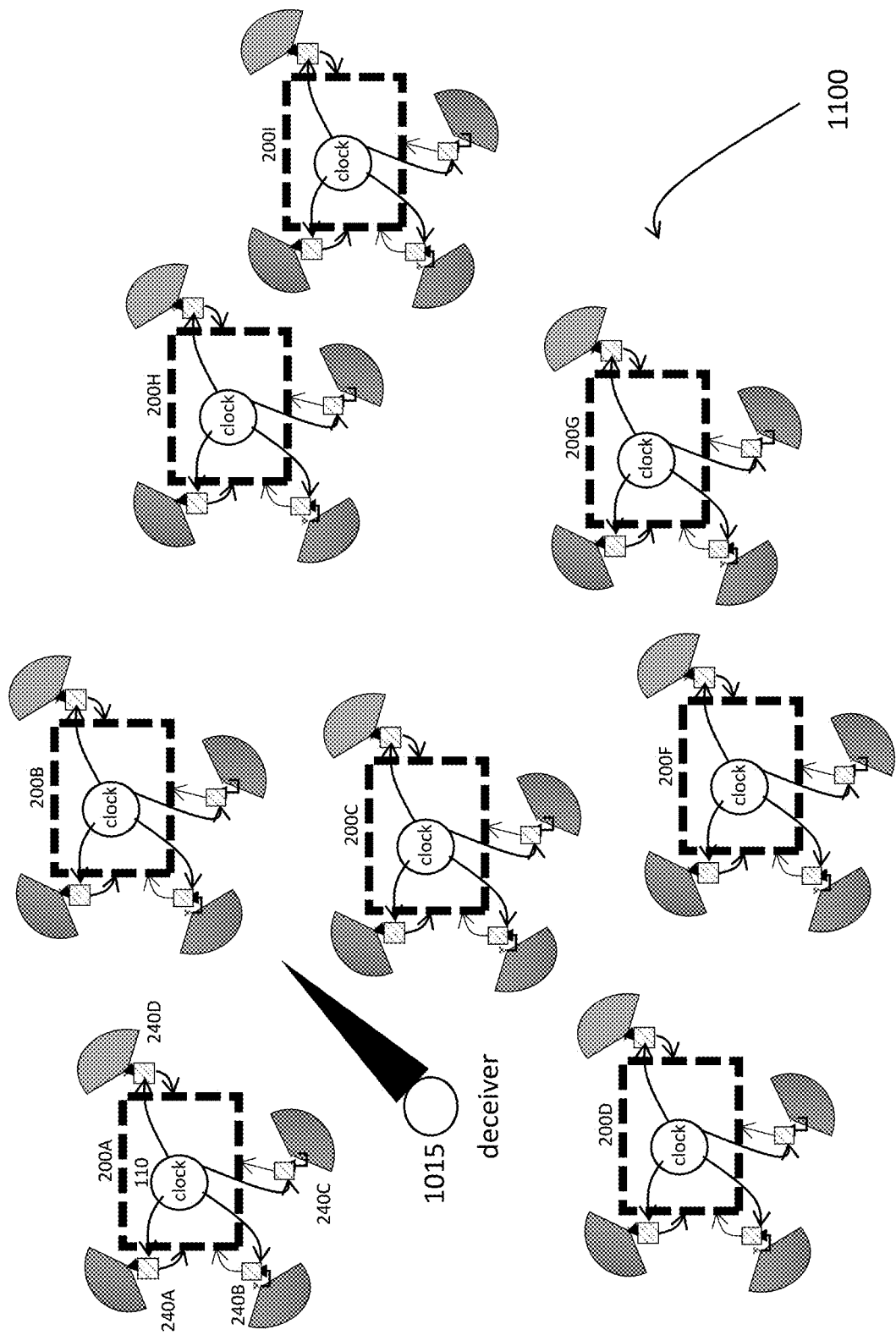
FIG. 12 shows a schematic of eight GNSS receiving systems that participate in time synchronization to prevent deceiver to corrupt all satellite signals according to some embodiments.

FIG. 12 shows a schematic of eight GNSS receiving systems that participate in time synchronization to prevent deceiver to corrupt all satellite signals according to some embodiments. To simplify the illustration, communication links between receiving systems are removed in FIG. 12. However, a large number of GNSS receiving systems is unnecessary for time synchronization and may be complicate the computations. To that end, some embodiments select a pair of GNSS receiving systems for each synchronization procedure and perform synchronization using the selected pair of GNSS receiving systems. The selection can be performed randomly, e.g., one GNSS receiving unit, 200C, decides which another receiving unit will be used according to a pseudorandom number generator (PRNG) or using any other selection method unknown to a potential deceiver, 1015. Since the selection method is shared among GNSS receiving systems and it is time varying, the deceiver needs to interfere with all satellite signals to ensure that all satellite signals are corrupted. This is virtually impossible when sufficient number of GNSS receiving systems participate in time synchronization. On the other hand, the time synchronization uses only two or a subset of GNSS receiving systems for each synchronization procedure to reduce the computation requirements of time synchronization.

Figure 13:
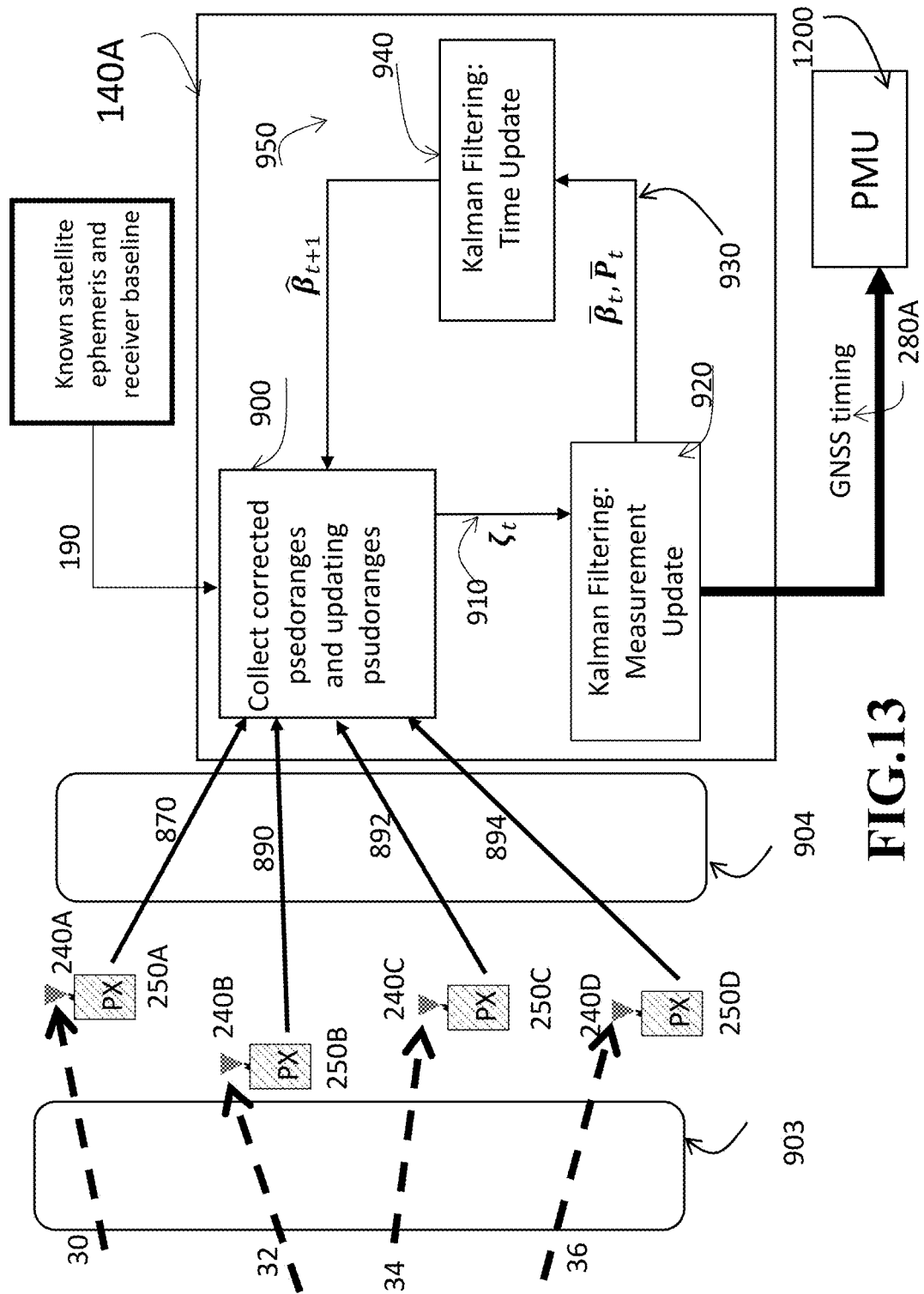
FIG. 13 shows an exemplar embodiment for providing a GNSS timing to phasor measurement unit.

FIG. 13 shows an exemplar embodiment for providing a GNSS timing to phasor measurement unit. In power grids, phasor measurement units (PMUs), 1200, are used in the substations to ensure phase synchronicity among portions of the power distribution network. Phase measurements at each PMU in the network are timestamped with data received from GPS signals. The time stamped measurements are used to compute phase differences among portions of the grid. By analyzing the precise timing of an electrical anomaly as it propagates through the power grid, it is easy to trace back the exact location of any outage in the power network, so that it avoids power outages. However, attackers can relatively easily modify the timestamps leading to power disruption. Thus, securing PMUs against deliberate spoofing, meaconing, or jamming of timing is important. According some embodiments, the PMU can use timing signal provided by 280A for the system with a single GNSS receiving system. Similarly, according to some embodiments, the wide-area network can also provide the PMU with the timing.

Figure 14:
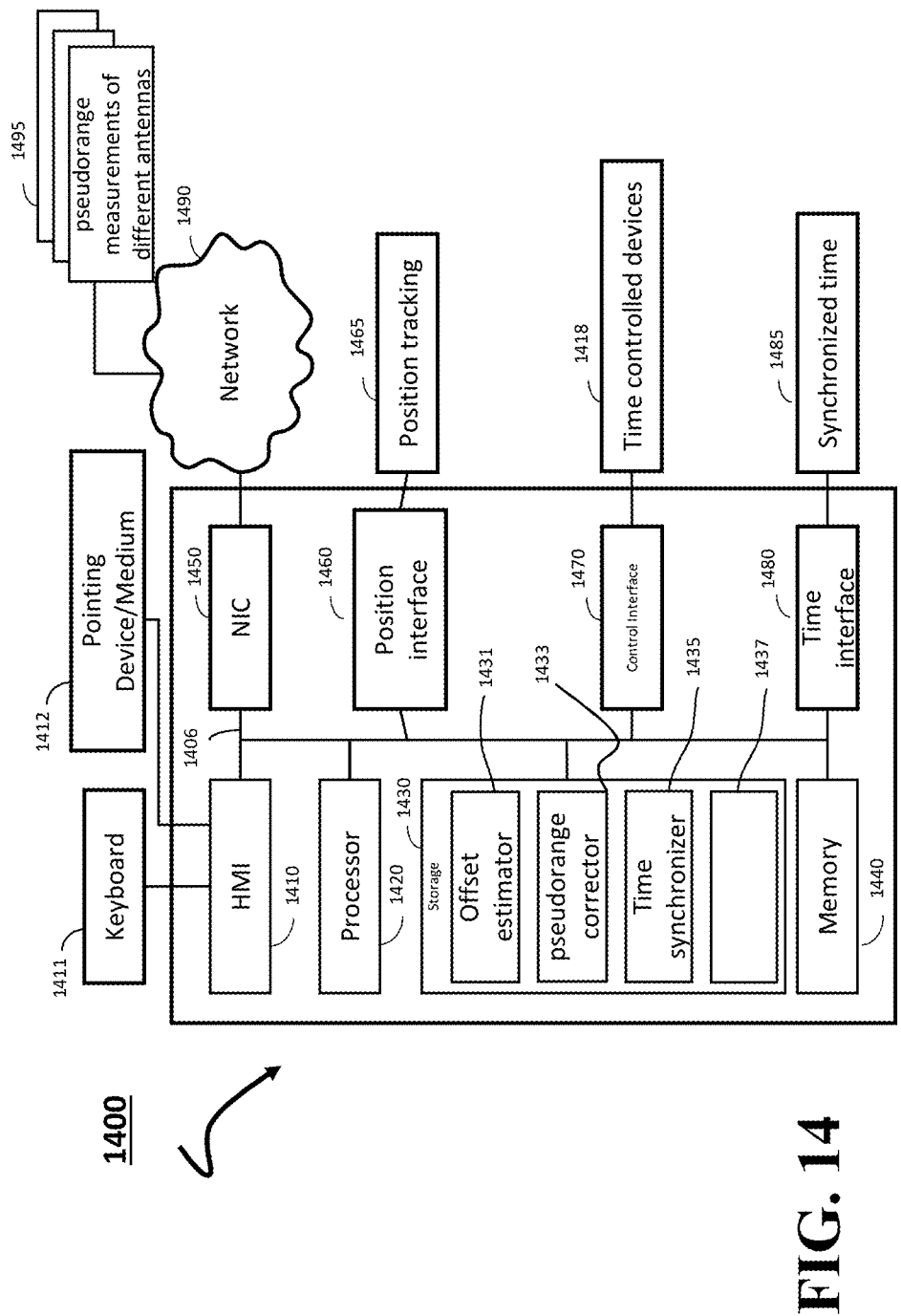
FIG. 14 shows a block diagram of a time synchronization system 1400 in accordance with some embodiments.

FIG. 14 shows a block diagram of a time synchronization system 1400 in accordance with some embodiments. The time synchronization system 1400 can have a number of interfaces connecting the system 1400 with other systems and devices. To that end, the system 1400 includes an input interface configured to receive pseudorange measurements from a set of antennas of at least one Global Navigation Satellite System (GNSS) receiving system that operates the antennas at known positions according to a common clock with an unknown time bias to receive signals from satellites in sight of the antennas For example, the time synchronization system 1400 can include a network interface controller 1450 is adapted to connect the system 1400 through the bus 1406 to a network 1490 connecting the system 1400 with the GNSS receiving systems. Through the network 1490, using the network interface controller 1450, the system 1400 can receive the pseudorange measurements 1495 of different antennas.

In some embodiments, the time synchronization system 1400 is integrated with the GNSS receiving system. In these embodiments, the network 1490 is wired network. In different embodiments, the time synchronization system 1400 is operatively connected to the GNSS receiving system. In these embodiments, the network 1490 is wired or wireless network. Additionally, or alternatively, in some embodiments, the time synchronization system 1400 is connected to multiple GNSS receiving systems. In these embodiments, the network 1490 is wired and/or wireless network.

In some implementations, a human machine interface 1410 within the system 1400 connects the system to a keyboard 1411 and pointing device 1412, wherein the pointing device 1412 can include a mouse, trackball, touchpad, joy stick, pointing stick, stylus, or touchscreen, among others. The system 1400 includes an output interface configured to output the time information. For example, the output interface can include a memory to render the common time bias and/or the time correction. For example, the system 1400 can be linked through the bus 1406 to a display interface adapted to connect the system 1400 to a display device, such as a computer monitor, camera, television, projector, or mobile device, among others. The system 1400 can also be connected to an application interface adapted to connect the system to equipment for performing various geodesy tasks.

The system 1400 includes a processor 1420 configured to execute stored instructions, as well as a memory 1440 that stores instructions that are executable by the processor. The processor 1420 can be a single core processor, a multi-core processor, a computing cluster, or any number of other configurations. The memory 1440 can include random access memory (RAM), read only memory (ROM), flash memory, or any other suitable memory systems. The processor 1420 is connected through the bus 1406 to one or more input and output devices. These instructions implement a method for time synchronization.

To that end, the system 1400 includes an offset estimator 1431 configured to compare the pseudorange measurements of different antennas to produce an antenna-specific clock offset for each of the antennas using satellite ephemeris and antennas baselines 1437. The offset estimator 1431 can use different techniques for determining the antenna-specific clock offset, such as deterministic estimation of the antenna-specific clock offsets, probabilistic estimation of the antenna-specific clock offsets and/or probabilistic estimation with belief propagation.

The system 1400 includes a pseudorange corrector 1433 configured to correct the pseudorange measurements of the antennas according to the antenna-specific clock offsets of corresponding antennas to produce corrected pseudorange measurements. The corrected pseudorange measurements can be determined deterministically and/or probabilistically. In addition, the system 1400 includes a time synchronizer 1435 configured to determine the time bias of the common clock using the corrected pseudorange measurements. Example of the time synchronizer 1435 is a Kalman filter.

The system 1400 includes an output interface configured to output the determined time bias. For example, the system 1400 can include a control interface 1470 configured to provide time estimation for time controlled devices, such as PMU device 1200. Additionally, or alternatively, the system 1400 can include a position interface 1460 for position tracking 1465 based on the estimation of the time bias of the clock and/or a time interface 1480 for providing the data indicative of time synchronization 1485.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A time synchronization system, comprising:
an input interface configured to receive pseudorange measurements from a set of antennas of at least one Global Navigation Satellite System (GNSS) receiving system that operates the set of antennas at known positions according to a clock with an unknown time bias to receive signals from satellites in sight of each antenna of the set of antennas;
a processor configured to:
compare the pseudorange measurements of the set of antennas to produce an antenna-specific clock offset for each antenna of the set of antennas, wherein to produce the antenna-specific clock offset for each antenna of the set of antennas, the processor is configured to:
determine, for each pair of antennas from the set of antennas, a difference pseudorange residual between pseudorange measurements of a pair of antennas of the set of antennas, wherein a pseudorange residual of a first antenna of the set of antennas removes known components from the pseudorange measurement of the first antenna, and wherein the difference pseudorange residual between the pair of antennas of the set of antennas removes common components in the pseudorange measurements of the pair of antennas of the set of antennas, such that the difference pseudorange residual includes a difference between the antenna-specific clock offsets of the pair of antennas of the set of antennas subject to noise; and compare the difference pseudorange residuals between different pairs of antennas of the set of antennas to produce the antenna-specific clock offset for each antenna of the set of antennas;

correct the pseudorange measurements of the set of antennas according to the antenna-specific clock offset for each antenna of the set of antennas to produce corrected pseudorange measurements; and determine the time bias of the clock using the corrected pseudorange measurements; and an output interface configured to output the determined time bias.

2. The time synchronization system of claim 1, wherein different antennas of the set of antennas are in sight of different combinations of the satellites, and wherein at least one first antenna of the set of antennas has a first antenna-specific clock offset different from a second antenna-specific clock offset of a second antenna of the set of antennas.

3. The time synchronization system of claim 1, wherein the processor is configured to compare the difference pseudorange residuals while ignoring the noise or by sampling the noise on a known distribution of the noise.

4. The time synchronization system of claim 1, wherein the processor is configured to:

for each pair of antennas of the set of antennas, probabilistically determine the difference pseudorange residuals using a Gaussian model for a distribution of difference pseudorange residual according to pseudorange measurements from all satellites in sight of respective pair of antennas of the set of antennas; and sample the distribution of the difference pseudorange residual of each pair of antennas to produce the antenna-specific clock offset for each antenna of the set of antennas by comparing the sampled distribution of the difference pseudorange residual of each pair of antennas.

5. The time synchronization system of claim 1, wherein to produce the antenna-specific clock offset for the first antenna of the set of antennas, the processor is configured to determine a probability of a first antenna-specific clock offset of the first antenna with respect to probabilities of antenna-specific clock offsets of a plurality of antennas of the set of antennas other than the first antenna as a marginal distribution of the first antenna-specific clock offset of the first antenna conditioned on a joint posteriori distribution of the antenna-specific clock offsets of all antennas of the set of antennas.

6. The time synchronization system of claim 5, wherein the antenna-specific clock offsets of all antennas of the set of antennas are determined based on corresponding marginal distributions of the antenna-specific clock offsets.

7. The time synchronization system of claim 5, wherein a second antenna-specific clock offset for a second antenna k of the set of antennas is determined using a belief propagation as a probabilistic belief $b_t(\alpha_k)$ at time t on a marginal distribution of an antenna-specific clock offset $\alpha_k$ using a product of a prior distribution of the probabilistic belief $b_t(\alpha_k)$ and incoming belief messages from all antennas of the set of antennas except the second antenna k.

8. The time synchronization system of claim 7, wherein the belief propagation updates the probabilistic belief $b_t(\alpha_k)$ of the probability of the antenna-specific clock offset $\alpha_k$ based on a computation of message from a factor node, $f_{k,n}$, to variable nodes and a computation of message, from a factor node, $f_k$, to a variable of the factor node, $f_k$.

9. The time synchronization system of claim 1, wherein the processor executes a Kalman filter configured to determine the time bias of the clock using the corrected pseudorange measurements of the set of antennas.

10. The time synchronization system of claim 1, wherein the set of antennas includes multiple directional antennas.

11. The time synchronization system of claim 1, wherein the at least one GNSS receiving system includes a set of GNSS receiving systems, wherein each GNSS receiving system of the set of GNSS receiving systems includes one or multiple antennas of the set of antennas.

12. The time synchronization system of claim 11, wherein the processor randomly selects a subset of GNSS receiving systems from the set of GNSS receiving systems to perform time synchronization.

13. The time synchronization system of claim 1, further comprising:

a phasor measurement unit configured to operate using the clock with the determined time bias.

14. A time synchronization method, wherein the method uses a processor coupled with stored instructions implementing the method, wherein the instructions, when executed by the processor carry out steps of the method, comprising:

receiving pseudorange measurements from a set of antennas of at least one Global Navigation Satellite System (GNSS) receiving system that operates the set of antennas at known positions according to a clock with an unknown time bias to receive signals from satellites in sight of each antenna of the set of antennas;

comparing the pseudorange measurements of the set of antennas to produce an antenna-specific clock offset for each antenna of the set of antennas, wherein a first antenna-specific clock offset for an antenna k of the set of antennas is determined using a belief propagation as a probabilistic belief $b_t(\alpha_k)$ at time t on a marginal distribution of an antenna-specific clock offset $\alpha_k$ using a product of a prior distribution of the probabilistic belief $b_t(\alpha_k)$ and incoming belief messages from all antennas of the set of antennas except the antenna k;

correcting the pseudorange measurement of the set of antennas according to the antenna-specific clock offset for each antenna of the set of antennas to produce corrected pseudorange measurements;

determining the time bias of the clock using the corrected pseudorange measurements; and correcting the time of the clock using the determined time bias.

15. The time synchronization method of claim 14, wherein different antennas of the set of antennas are in sight of different combinations of the satellites, and wherein, at least one first antenna of the set of antennas has a second antenna-specific clock offset different from a third antenna-specific clock offset of a second antenna of the set of antennas.

16. The time synchronization method of claim 14, further comprising:

determining a probability of a second antenna-specific clock offset of a first antenna with respect to probabilities of antenna-specific clock offsets of a plurality of antennas of the set of antennas other than the first antenna as a marginal distribution of the second antenna-specific clock offset of the first antenna conditioned on a joint posteriori distribution of the antenna-specific clock offsets of all antennas of the set of antennas.

17. A non-transitory computer readable storage medium embodied thereon a program executable by a processor for performing a method, the method comprising:

receiving pseudorange measurements from a set of antennas of at least one Global Navigation Satellite System (GNSS) receiving system that operates the set of antennas at known positions according to a clock with an unknown time bias to receive signals from satellites in sight of each antenna of the set of antennas;

comparing the pseudorange measurements of the set of antennas to produce an antenna-specific clock offset for each antenna of the set of antennas by:

determining, for each pair of antennas from the set of antennas, a difference pseudorange residual between pseudorange measurements of a pair of antennas of the set of antennas, wherein a pseudorange residual of a first antenna of the set of antennas removes known components from the pseudorange measurement of the first antenna, and wherein the difference pseudorange residual between the pair of antennas of the set of antennas removes common components in the pseudorange measurements of the pair of antennas of the set of antennas, such that the difference pseudorange residual includes a difference between the antenna-specific clock offsets of the pair of antennas of the set of antennas subject to noise; and comparing the difference pseudorange residuals between different pairs of antennas of the set of antennas to produce the antenna-specific clock offset for each antenna of the set of antennas;

correcting the pseudorange measurement of the set of antennas according to the antenna-specific clock offset for each antenna of the set of antennas to produce corrected pseudorange measurements;

determining the time bias of the clock using the corrected pseudorange measurements; and outputting the determined time bias.

18. The medium of claim 17, wherein the method comprising:

determining a probability of a first antenna-specific clock offset of the first antenna with respect to probabilities of antenna-specific clock offsets of a plurality of antennas of the set of antennas other than the first antenna as a marginal distribution of the first antenna-specific clock offset of the first antenna conditioned on a joint posteriori distribution of the antenna-specific clock offsets of all antennas of the set of antennas.

19. The medium of claim 17, wherein the antenna-specific clock offsets of all antennas of the set of antennas are determined based on corresponding marginal distributions of the antenna-specific clock offsets.

20. The medium of claim 19, wherein a second antenna-specific clock offset for a second antenna k of the set of antennas is determined using a belief propagation as a probabilistic belief $b_t(\alpha_k)$ at time t on a marginal distribution of an antenna-specific clock offset $\alpha_k$ using a product of a prior distribution of the probabilistic belief $b_t(\alpha_k)$ and incoming belief messages from all antennas of the set of antennas except the second antenna k.

* * * * *